(12) United States Patent
Butcher et al.

(10) Patent No.: US 12,499,257 B2
(45) Date of Patent: *Dec. 16, 2025

(54) REPEATABLE NGAC POLICY CLASS STRUCTURE

(71) Applicant: Tetrate.io, San Francisco, CA (US)

(72) Inventors: Zack Daniel Butcher, San Francisco, CA (US); Ignacio Barrera Caparros, Barcelona (ES); Joshua Douglas Roberts, Ashburn, VA (US)

(73) Assignee: Tetrate.io, San Francisco, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/952,987

(22) Filed: Nov. 19, 2020

(65) Prior Publication Data

US 2022/0156393 A1     May 19, 2022

(51) Int. Cl.
G06F 21/62     (2013.01)
G06F 9/50      (2006.01)

(52) U.S. Cl.
CPC ........ *G06F 21/6218* (2013.01); *G06F 9/5011* (2013.01)

(58) Field of Classification Search
CPC ............................ G06F 21/6218; G06F 9/5011
(Continued)

(56) References Cited

U.S. PATENT DOCUMENTS 5,936,860 A * 8/1999 Arnold .................. G06F 8/24
                                                    709/200
6,105,053 A * 8/2000 Kimmel ............. G06F 9/5016
                                                    718/105

(Continued)

FOREIGN PATENT DOCUMENTS

CA     2130704 A1 *  2/1996
CN   101513091 A  *  8/2009 ............ H04W 12/08
(Continued)

OTHER PUBLICATIONS

"Ticketmaster Adds SafeTix™ Encrypted Tickets to Next Generation Access Control Platform", May 15, 2019, https://business.ticketmaster.com/blog/ticketmaster-adds-safetix-encrypted-ticketsto-next-generation-access-control-platform/, 4 pages. (Year: 2019 ).*

(Continued)

*Primary Examiner* — Luu T Pham
*Assistant Examiner* — Walter J Malinowski
(74) *Attorney, Agent, or Firm* — FIG. 1 Patents

(57) ABSTRACT

In implementations of a repeatable NGAC policy class structure, a computing device implements a next generation access control (NGAC) graph that includes user elements representing users, object elements representing resources, and multiple policy classes modeled with a composable policy class structure that is repeatable to instantiate each of the multiple policy classes in the graph. The composable policy class structure includes a policy class as enforceable access criteria by which the user elements are allowed or denied access to the object elements that represent the resources, an exclusion default object node and an exclusion default user node of the policy class, and an association that indicates object elements contained as members of the exclusion default object node granting all policy permissions to user elements contained as members of the exclusion default user node. The NGAC graph can be utilized to compute an access control decision across the multiple policy classes.

19 Claims, 11 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 8,875,230 | B1* | 10/2014 | Weiner | H04L 63/10 726/1 |
| 10,754,963 | B2* | 8/2020 | Scheideler | G06N 5/022 |
| 10,984,117 | B2* | 4/2021 | Shankar | G06Q 20/38215 |
| 2003/0022658 | A1* | 1/2003 | Chapman, Jr. | H04W 84/14 455/414.1 |
| 2005/0267663 | A1* | 12/2005 | Naono | G05B 13/024 701/36 |
| 2006/0167867 | A1* | 7/2006 | Schach | G06F 16/83 707/E17.127 |
| 2007/0061795 | A1* | 3/2007 | Atsatt | G06F 9/445 717/166 |
| 2007/0136603 | A1* | 6/2007 | Kuecuekyan | H04L 63/0884 713/185 |
| 2009/0178107 | A1* | 7/2009 | Karjoth | G06F 16/24564 707/999.102 |
| 2010/0281455 | A1* | 11/2010 | Anand | G06F 8/35 717/104 |
| 2011/0072506 | A1* | 3/2011 | Law | H04L 63/1416 726/11 |
| 2011/0088011 | A1* | 4/2011 | Ouali | G06F 11/3696 717/105 |
| 2013/0227638 | A1* | 8/2013 | Giambiagi | G06F 21/00 726/1 |
| 2014/0280433 | A1* | 9/2014 | Messerli | H04L 67/10 709/201 |
| 2015/0180901 | A1* | 6/2015 | Weiner | H04L 63/18 726/1 |
| 2016/0036860 | A1* | 2/2016 | Xing | H04L 63/20 726/1 |
| 2017/0024572 | A1* | 1/2017 | Ferraiolo | G06F 16/176 |
| 2017/0147709 | A1* | 5/2017 | Ganz | H04L 67/10 |
| 2017/0187751 | A1* | 6/2017 | Andrews | H04L 67/51 |
| 2017/0302531 | A1* | 10/2017 | Maes | H04L 63/1416 |
| 2019/0058709 | A1* | 2/2019 | Kempf | G06F 21/64 |
| 2019/0327271 | A1* | 10/2019 | Saxena | H04L 41/16 |
| 2020/0410170 | A1* | 12/2020 | Good | G06F 40/295 |
| 2021/0120555 | A1* | 4/2021 | Badic | H04W 72/082 |
| 2021/0240312 | A1* | 8/2021 | Wohlstadter | G06K 7/1413 |
| 2021/0279355 | A1* | 9/2021 | Otte | G06F 21/6218 |
| 2021/0341894 | A1* | 11/2021 | Leander | G05B 19/0426 |
| 2022/0159003 | A1* | 5/2022 | Butcher | H04L 63/101 |
| 2022/0327223 | A1* | 10/2022 | Norman | G06F 21/604 |

FOREIGN PATENT DOCUMENTS

| | | | | | |
|---|---|---|---|---|---|
| CN | 102915447 | A | * | 2/2013 | |
| CN | 103457958 | A | * | 12/2013 | |
| CN | 104009959 | A | * | 8/2014 | |
| CN | 105095777 | A | * | 11/2015 | |
| CN | 106919956 | A | * | 7/2017 | ........... A61B 5/0476 |
| CN | 114647825 | A | * | 6/2022 | |
| WO | WO-2018237098 | A1 | * | 12/2018 | ......... G06Q 30/0201 |

OTHER PUBLICATIONS

International Committee for Information Technology Standards, Next Generation Access Control-Functional Architecture (NG ACFA), INCITS 499-201x, Mar. 19, 2012 (Year: 2012).*

Basnet, Rejina, Subhojeet Mukherjee, Vignesh M. Pagadala, and Indrakshi Ray. "An efficient implementation of next generation access control for the mobile health cloud." In 2018 Third International Conference on Fog and Mobile Edge Computing (FMEC), pp. 131-138. IEEE, 2018. (Year: 2018).*

Chiquito, Alex, Ulf Bodin, and Olov Schelén. "Fine-grained Access Control for Time-Series Databases using NGAC." In 2021 IEEE 19th International Conference on Industrial Informatics (INDIN), pp. 1-8. IEEE, 2021. (Year: 2021).*

Mell, Peter, James M. Shook, and Serban Gavrila. "Restricting insider access through efficient implementation of multi-policy access control systems." In Proceedings of the 8th ACM CCS International Workshop on Managing Insider Security Threats, pp. 13-22. 2016. (Year: 2016).*

Rassadko, Nataliya. "Policy classes and query rewriting algorithm for XML security views." In IFIP Annual Conference on Data and Applications Security and Privacy, pp. 104-118. Springer, Berlin, Heidelberg, 2006. (Year: 2006).*

Ferraiolo, David, Serban Gavrila, and Wayne Jansen. "On the unification of access control and data services." In Proceedings of the 2014 IEEE 15th International Conference on Information Reuse and Integration (IEEE IRI 2014), pp. 450-457. IEEE, 2014. (Year: 2014).*

"Managing federations of virtualized infrastructures: A semantic-aware policy based approach." In 12th IFIP/IEEE International Symposium on Integrated Network Management (IM 2011) and Workshops, pp. 1235-1242. IEEE, 2011. (Year: 2011).*

Lawal. "Enabling flexible administration in ABAC through policy review: A policy machine case study." IEEE Intl Conference on Intelligent Data and Security (IDS), pp. 69-74. IEEE, 2021. (Year: 2021).*

Luo, Xiao-feng, and Sen Wang. "Improved access control decision diagrams for ABAC policy evaluation and management." In 2019 6th International Conference on Systems and Informatics (ICSAI), pp. 932-937. IEEE, 2019. (Year: 2019).*

* cited by examiner

REPEATABLE NGAC POLICY CLASS STRUCTURE

BACKGROUND

Generally, access control in the context of information security can be modeled and implemented to regulate access requests to view and/or edit resources, such as electronic documents and other information that is stored and accessible in a computing environment. Notably, the goal of an access control policy is to prevent unauthorized and/or unintended access to the resources, and enforcement of designated permissions that may be granted to various users and/or client applications that seek to access and perform operations on a set of resources. Conventional and widely used access control models include the Attribute-Based Access Control (ABAC) model and the Role-Based Access Control (RBAC) model.

Generally, the ABAC model is used to develop access control policies, expressing a complex Boolean rule set used to evaluate many different attributes. Although ABAC is generally regarded as complicated to understand and difficult to use for authoring an access control policy that operates as intended, it is flexible and can be used to model many different types of access control policies for information security based on attribute types assigned to the various users and/or client applications that may request access to a resource. The RBAC model, on the other hand, is generally regarded as easy to understand and usable to author access control policies that perform information security access control correctly. RBAC-based systems designate user roles, such as in the context of a doctor, a bank teller, a computer, a client application, etc., to make access control decisions. However, with RBAC, it can be difficult to identify and manage every user role possibility, leading to an exponential expansion or explosion of the roles being modeled.

A developing access control model is Next Generation Access Control (NGAC), which is generally defined as an attribute-based access control model. The NGAC specification was developed by the National Institute of Standards and Technology (NIST), and is an American National Standard for Information Technology (ANSI) Insights standard, also referred to as the INCITS NGAC Specification. The NGAC model is an architecture designed to be separable from any particular policy or type of policy, and can provide access control for simple systems, as well as highly-distributed computing environments. A policy author can use NGAC to directly model users, objects, and their relations in an NGAC graph, and apply access control decisions by traversing the graph. Although NGAC has the flexibility of ABAC to develop many different types of access control policies for information security, the NGAC specification has design limitations and is left open for changing technologies. Notably, the NGAC specification generally describes what constitutes a valid implementation, but does not provide significant guidance or implementation details.

SUMMARY

This Summary introduces features and concepts of a repeatable NGAC policy class structure, which is further described below in the Detailed Description and shown in the Figures. This Summary should not be considered to describe essential features of the claimed subject matter, nor used to determine or limit the scope of the claimed subject matter.

Aspects of a repeatable NGAC policy class structure are described. In implementations, a computing device can generate a next generation access control (NGAC) graph having a bifurcated structure with a user section and an object section. Users can be modeled as user elements in the user section of the NGAC graph, and resources can be modeled as object elements in the object section of the NGAC graph. Multiple policy classes can be configured utilizing a composable policy class structure that is repeatable to instantiate each of the multiple policy classes in the NGAC graph. The composable policy class structure includes a policy class as enforceable access criteria by which the users are allowed or denied access to the resources. The composable policy class structure also includes an exclusion default object node of the policy class instantiated in the object section of the NGAC graph, and an exclusion default user node of the policy class instantiated in the user section of the NGAC graph.

The composable policy class structure also includes an association that indicates the object elements contained as members of the exclusion default object node grant all policy permissions of the policy class to the user elements that are members of the exclusion default user node. The policy permissions granted by the object elements allow the users to perform operations on contents of the object elements that represent the resources in the NGAC graph. One or more of the user elements that represent the users in the user section of the NGAC graph can each be contained as a member of the policy class via the exclusion default user node of the policy class. Similarly, one or more of the object elements that represent the resources in the object section of the NGAC graph can each be contained as a member of the policy class via the exclusion default object node of the policy class.

The composable policy class structure is repeatable, from which the multiple policy classes can be instantiated in the NGAC graph, including different types of policy classes. A single access control decision can be computed based on the multiple, different types of policy classes in the NGAC graph. The single access control decision is based on a strict evaluation mode configured as an intersection of the policy permissions granted by the object elements to access the resources for the user elements. In an implementation, the multiple, different types of policy classes in the NGAC graph include at least a location policy class and a role-based access control (RBAC) policy class. Additionally, a policy node can be modeled in the user section of the NGAC graph, and one or more of the user elements that each represent a respective user in the user section of the NGAC graph can be contained as a member of the policy node. Separable policy bindings can also be modeled in the user section of the NGAC graph, where each separable policy binding corresponds to one of the multiple policy classes, and a separable policy binding is assigned as a member to the corresponding policy class. The policy node can be assigned to the separable policy bindings in the user section of the NGAC graph.

In other aspects of repeatable NGAC policy class structure, a computing device can execute an instantiation of a next generation access control (NGAC) graph that includes user elements representing users, object elements representing resources, and multiple policy classes modeled with a composable policy class structure that is repeatable to instantiate each of the multiple policy classes in the NGAC graph. The computing device can receive a request for a user element to access an object element of a resource in conformance with a granted access permission implemented in the NGAC graph. The computing device can compute an access control decision across the multiple policy classes utilizing the NGAC graph as a basis to evaluate whether the user element is authorized to access the object element of the resource. The computing device can then return, in response to the request, the access control decision that indicates to allow or deny the user element access to the object element of the resource based on the evaluation utilizing the NGAC graph. The access control decision can be computed as a single access control decision across different types of the multiple policy classes in the NGAC graph, and the single access control decision is based on a strict evaluation mode configured as an intersection of the policy permissions granted by the object elements to access resources for the user elements.

The composable policy class structure includes a policy class as enforceable access criteria by which the user elements are allowed or denied access to the object elements that represent the resources. The composable policy class structure also includes an exclusion default object node of the policy class, an exclusion default user node of the policy class, and an association that indicates the object elements contained as members of the exclusion default object node grant all policy permissions of the policy class to the user elements that are members of the exclusion default user node. The policy permissions granted by the object elements allow the user elements to perform operations on contents of the object elements that represent the resources. In implementations, one or more of the user elements can each be contained as a member of the policy class via the exclusion default user node of the policy class, and one or more of the object elements can each be contained as a member of the policy class via the exclusion default object node of the policy class. The different types of the multiple policy classes in the NGAC graph can include a location policy class, a role-based access control (RBAC) policy class, and/or a time policy class. Additionally, the NGAC graph includes separable policy bindings that each correspond to one of the multiple policy classes, and the separable policy bindings are generally each assigned to the corresponding policy class. The NGAC graph can also include a policy node assigned to the separable policy bindings, and one or more of the user elements that each represent a respective user are assigned as a member of the policy node.

In other aspects of repeatable NGAC policy class structure, a computing device is implemented for graph-based access control in a digital medium environment, and the computing device includes a memory to maintain a next generation access control (NGAC) graph that includes user elements representing users, object elements representing resources, and multiple policy classes modeled with a composable policy class structure that is repeatable to instantiate each of the multiple policy classes in the NGAC graph. The computing device implements a policy decision module that is designed to receive a request to access an object element of a resource in conformance with an access permission granted to a user element implemented in the NGAC graph. The policy decision module can compute an access control decision across the multiple policy classes utilizing the NGAC graph as a basis to evaluate whether the user element is authorized to access the object element of the resource. The policy decision module can then initiate a response to the request as the access control decision that indicates to allow or deny the user element access to the object element of the resource based on the evaluation utilizing the NGAC graph.

BRIEF DESCRIPTION OF THE DRAWINGS

Implementations of a repeatable NGAC policy class structure are described with reference to the following Figures. The same numbers may be used throughout to reference similar features and components that are shown in the Figures.

DETAILED DESCRIPTION

Figure 1:
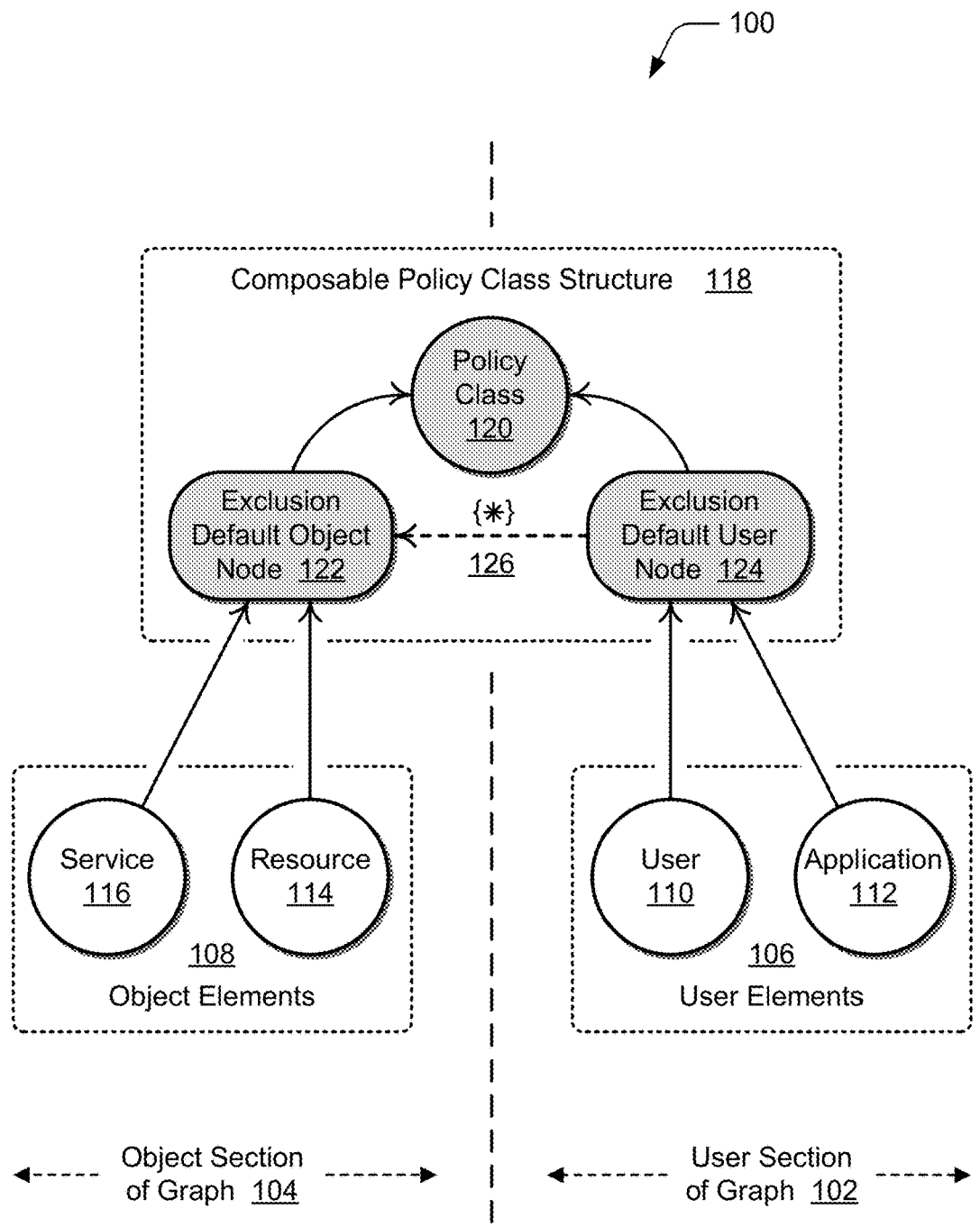
FIG. 1 illustrates an example of a next generation access control (NGAC) graph that includes features of a repeatable NGAC policy class structure.

Implementations of a repeatable NGAC policy class structure are described, and generally in the context of information security and access control policies, provide a composable policy class structure that is repeatable to instantiate multiple policy classes in an NGAC graph. The composable policy class structure is also usable to introduce a new policy class into the graph without affecting or breaking other policy classes that have already been modeled in the graph. Notably, the NGAC specification does not specify or detail any such graph configuration to implement or model NGAC. The overall NGAC graph configuration, along with the composable policy class structure that is repeatable to model access control policies as described herein, also provides for reusing current NGAC graph nodes that already exist in the graph when adding a new policy class to the graph. The ability to reuse current NGAC graph nodes when modeling multiple policy classes can prevent or reduce the problems of exponential node expansion that is inherent with other types of access control systems, leading to improved computational speed when computing an access control decision using the NGAC graph, and reduced memory storage space needed to save an overall instantiation of the graph.

In NGAC convention, an NGAC graph is generally modeled to include different types of nodes, such as user elements and object elements, as well as user attributes, object attributes, and policy classes. The user attributes serve to distinguish between distinct classes of the users in the graph, and similarly, the object attributes serve to distinguish between different types of the objects in the graph. An NGAC graph also includes associations that allocate policy permissions from the object elements to the user elements. However, the NGAC specification does not provide implementation details describing how to model multiple policy classes in an NGAC graph, or what may be considered best practices. Notably, the NGAC specification is open-ended, allowing for flexibility and technology changes that may necessitate adaptation.

Given that NGAC is intended take into account the access control policy permissions designated by a combination of multiple policy classes to compute an access control decision, the overall NGAC graph configuration, along with the composable policy class structure that is repeatable to instantiate the multiple policy classes, is novel to NGAC itself, as well as novel in terms of the repeatable NGAC policy class structure described herein. Further, implementations of the repeatable NGAC policy class structure are described in the context of implementing the NGAC graph with the multiple policy classes that include a role-based access control (RBAC) policy class and a location policy class. Notably, the current NGAC specification does not provide a context in which to implement a location-based policy class within the current NGAC default policies. However, as described herein in the context of the repeatable NGAC policy class structure, the NGAC graph can include a location policy class as one of the multiple policy classes utilized to compute an access control decision based on the multiple policy classes.

While features and concepts of a repeatable NGAC policy class structure can be implemented in any number of different devices, systems, networks, environments, and/or configurations, implementations of a repeatable NGAC policy class structure are described in the context of the following example devices, systems, environments, and methods.

FIG. 1 illustrates an example of a next generation access control (NGAC) graph 100 that includes features of a repeatable NGAC policy class structure, as described herein. The NGAC graph 100 can be generated having a bifurcated structure with a user section 102 of the graph, and an object section 104 of the graph. The respective sections of the NGAC graph 100 may also be referred to as the user side and the object side of the graph, and each section or side of the graph includes independent, but related entities referred to generally as the users and objects. The NGAC graph 100 can include any number and different types of users that are modeled as user elements 106 in the user section 102 of the graph, and can include any number and different types of resources that are modeled as object elements 108 in the object section 104 of the graph.

The user elements 106 represent any type of user entity, such as a user 110 or an application 112, that can request access to the resources based on access criteria and permissions established by multiple policy classes, which are also modeled in the NGAC graph 100. In this example, the user 110 may be modeled as one or many users, such as a group or team of users. Similarly, the application 112 may be modeled as one or many instantiations of an application, or as separate modules or functions of the application. The object elements 108 also represent any type of resource entity, such as a resource 114 or a service 116, that is accessible by a user having allowable access permissions, or is protected from user access by a user that does not have allowable access permissions. In this example, the resource 114 and/or the service 116 may also be modeled as one or multiple instances of the respective resource or service.

In NGAC convention, the NGAC graph 100 is generally modeled to include different types of nodes, such as the user elements 106 and the object elements 108, as well as user attributes, object attributes, and policy classes. The user attributes serve to distinguish between distinct classes of the users in the graph, and similarly, the object attributes serve to distinguish between different types of the objects in the graph.

In aspects of the described repeatable NGAC policy class structure, the NGAC graph 100 includes a composable policy class structure 118, which is repeatable to instantiate multiple policy classes of the NGAC graph 100. For example, the policy class 120, and subsequent policy classes, can be configured in the NGAC graph 100 utilizing the composable policy class structure 118 in a repeatable manner. The composable policy class structure 118 provides a safe way to introduce a new policy class into the NGAC graph 100 without affecting or breaking another policy class that has already been modeled in the graph. Additional examples of NGAC graphs having multiple policy classes are further shown and described with reference to FIGS. 2-7. Notably, the composable policy class structure 118 is repeatable effective to coordinate multiple policy classes, including different types of policy classes, in the NGAC graph 100. The composable policy class structure 118 is repeatable, from which the multiple policy classes can be instantiated in an NGAC graph.

The composable policy class structure 118 includes the policy class 120, which provides an enforceable access criteria by which the users are allowed or denied access to the object elements (e.g., the resources and services). Generally, a policy class defines the entity relationships, access rights, and operations of an access control policy. The NGAC graph 100 can be modeled or implemented with multiple, different types of policy classes, which can include a location policy class, a role-based access control (RBAC) policy class, a time policy class, and/or any other type of policy class utilized in the context of an access control policy.

The composable policy class structure 118 includes an exclusion default object node 122 of the policy class 120 instantiated in the object section 104 of the NGAC graph. Similarly, the composable policy class structure 118 includes an exclusion default user node 124 of the policy class 120 instantiated in the user section 102 of the NGAC graph. The exclusion default object node 122 is an example of an object attribute in the NGAC graph 100, and the exclusion default user node 124 is an example of a user attribute in the NGAC graph. The exclusion default object node 122 and the exclusion default user node 124 are each assigned as members of the policy class 120, in the respective object section 104 and the user section 102 of the graph. This effectively models the policy class 120 as an exemption in the NGAC graph 100. In NGAC convention, a node designation is referred to as an assignment, and the assignments are used to indicate relationships between the user elements 106 and user attributes, between the object elements 108 and object attributes, as well as the relationships between the user attributes and the policy classes, and the object attributes and the policy classes.

In implementations, one or more of the user elements 106 that represent the various users (e.g., user 110 and application 112) in the user section 102 of the NGAC graph 100 can each be contained as a member of the policy class 120 via the exclusion default user node 124 of the policy class. Similarly, one or more of the object elements 108 that represent the various resources (e.g., resource 114 and service 116) in the object section 104 of the NGAC graph 100 can each be contained as a member of the policy class 120 via the exclusion default object node 122 of the policy class. In implementations, a user element in the NGAC graph 100 can be designated, related, or contained as a member of a policy class, such as via an exclusion default user node and/or via a policy binding. Alternatively stated, the policy class contains the user element. Similarly, an object element in the NGAC graph 100 can be designated, related, or contained as a member of a policy class, such as via an exclusion default object node and/or via a policy binding. Notably, if an object element 108 that is not contained by the policy class 120 in some way on the object side (e.g., in the object section 104 of the graph), then the policies of the policy class 120 do not apply to the object element, regardless of whether the user element on the user side (e.g., in the user section 102 of the graph) is contained as a member of the policy class.

The composable policy class structure 118 also includes an association 126 that indicates the object elements 108 contained as members of the exclusion default object node 122 granting all of the policy permissions to the user elements 106 that are contained as members of the exclusion default user node 124. Generally, the association 126 is a directed graph edge that represents and defines the authorization of access rights between policy elements, such as for operations to read, write, create, and/or delete policy elements and relations. In this example, the policy permissions indicated by the association 126 allow the user elements 106 to perform operations on contents of the object elements 108 that represent the various resources, such as the resource 114 and the service 116.

Figure 2:
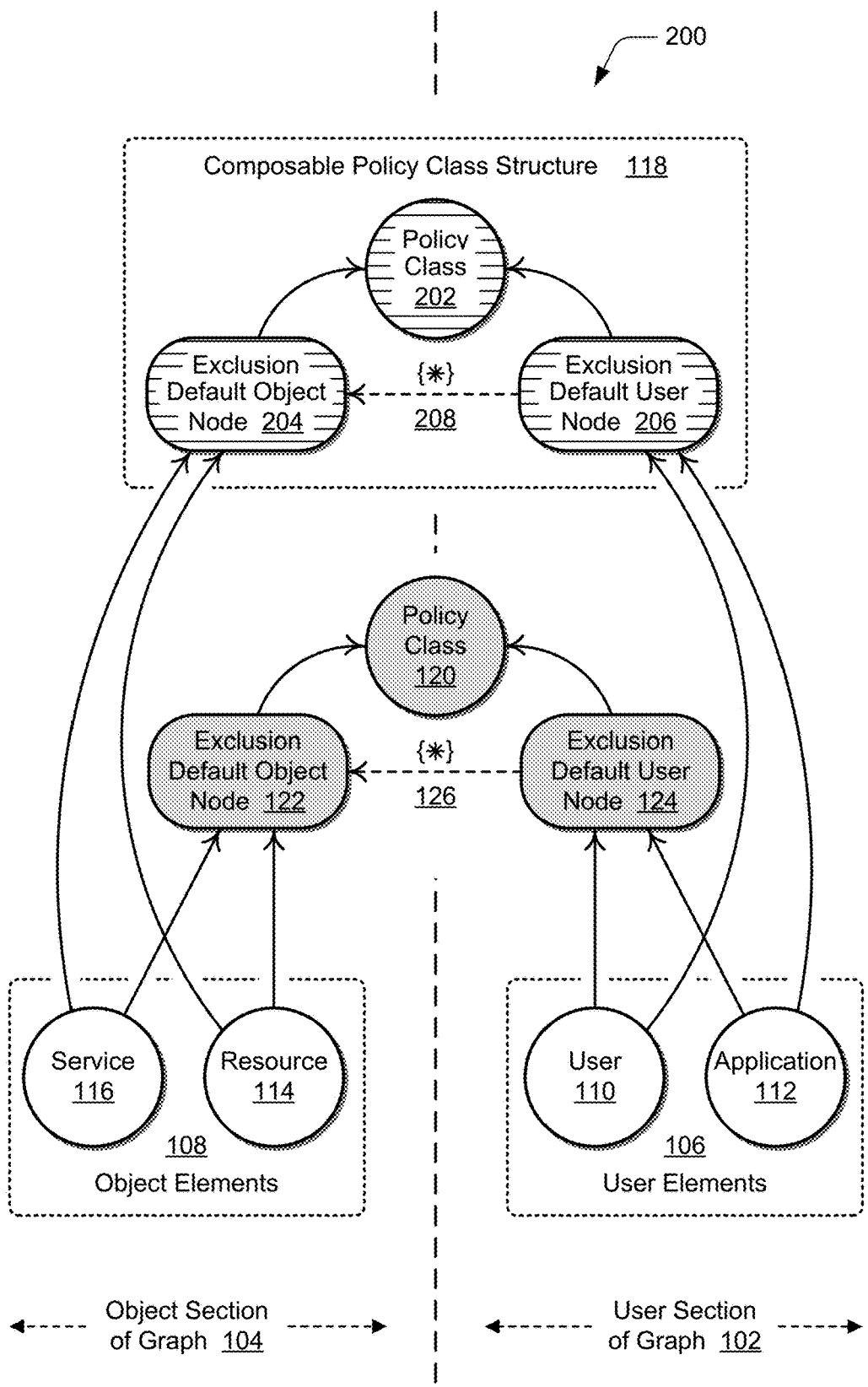
FIG. 2 further illustrates an example of the NGAC graph that includes features of the repeatable NGAC policy class structure.

FIG. 2 further illustrates an example 200 of the next generation access control (NGAC) graph 100 that includes features of the described repeatable NGAC policy class structure. As shown and described with reference to FIG. 1, the NGAC graph 100 includes the user elements 106 and the object elements 108, as well as the policy class 120. In this example 200, the composable policy class structure 118 is utilized to instantiate and configure another policy class 202 of the NGAC graph 100. Together, the multiple policy classes (e.g., policy class 120 and policy class 202) provide the enforceable access criteria by which the user elements 106 that represent the users are allowed or denied access to the object elements 108 that represent the resources and/or services.

The composable policy class structure 118 includes an exclusion default object node 204 of the policy class 202 instantiated in the object section 104 of the NGAC graph 100. Similarly, the composable policy class structure 118 includes an exclusion default user node 206 of the policy class 202 instantiated in the user section 102 of the NGAC graph. The exclusion default object node 204 and the exclusion default user node 206 are each assigned as members of the policy class 202, in the respective object section 104 and the user section 102 of the graph. The composable policy class structure 118 also includes an association 208 that indicates the object elements 108 contained as members of the exclusion default object node 204 granting all of the policy permissions to the user elements 106 that are contained as members of the exclusion default user node 206. The policy permissions indicated by the association 208 allow the user elements 106 to perform operations on contents of the object elements 108 that represent the various resources, such as the resource 114 and the service 116.

As described with reference to the NGAC graph 100 shown in FIG. 1, one or more of the user elements 106 that represent the various users (e.g., user 110 and application 112) in the user section 102 of the NGAC graph 100 can each be contained as a member of the policy class 202 via the exclusion default user node 206 of the policy class 202. Similarly, one or more of the object elements 108 that represent the various resources (e.g., resource 114 and service 116) in the object section 104 of the NGAC graph 100 can each be contained as a member of the policy class 202 via the exclusion default object node 204 of the policy class 202.

Figure 3:
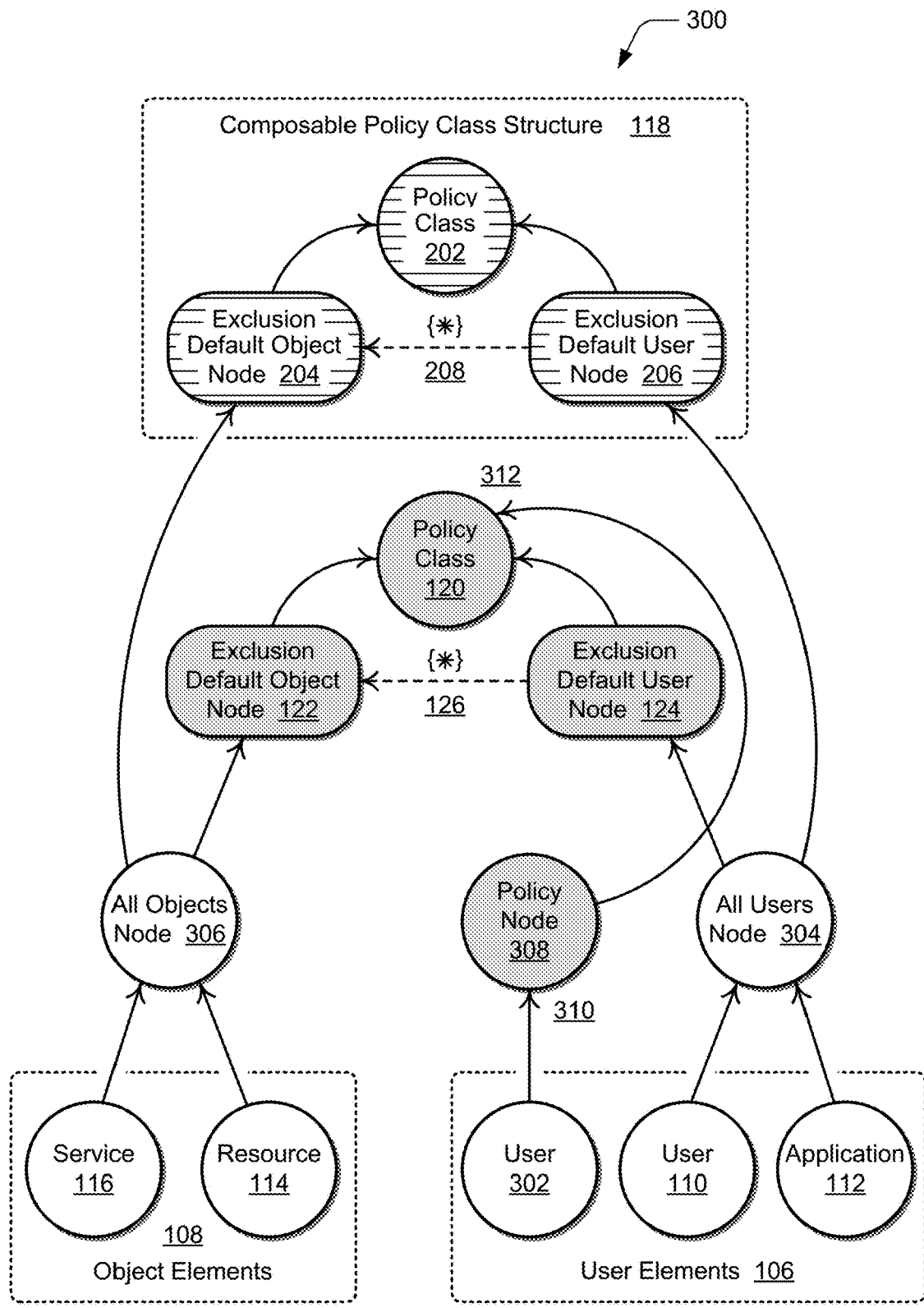
FIG. 3 further illustrates an example of the NGAC graph that includes features of the repeatable NGAC policy class structure.

FIG. 3 further illustrates an example 300 of the next generation access control (NGAC) graph 100 that includes features of the described repeatable NGAC policy class structure. As shown and described with reference to FIGS. 1 and 2, the NGAC graph 100 includes the user elements 106 and the object elements 108, as well as the policy class 120 and the policy class 202. In this example 300, the multiple policy classes (e.g., policy class 120 and policy class 202) provide the enforceable access criteria by which the user elements 106 that represent the users are allowed or denied access to the object elements 108 that represent the resources and/or services.

As described with reference to the NGAC graph 100 shown in FIGS. 1 and 2, one or more of the user elements 106 that represent the various users (e.g., user 110 and application 112) in the user section 102 of the NGAC graph 100 can each be contained as a member of the policy class 120 via the exclusion default user node 124 of the policy class 120 and/or as a member of the policy class 202 via the exclusion default user node 206 of the policy class 202. Similarly, one or more of the object elements 108 that represent the various resources (e.g., resource 114 and service 116) in the object section 104 of the NGAC graph 100 can each be contained as a member of the policy class 120 via the exclusion default object node 122 of the policy class 120 and/or as a member of the policy class 202 via the exclusion default object node 204 of the policy class 202. This example 300 also includes an additional user 302 modeled in the NGAC graph as one of the user elements 106.

In an alternative configuration as shown in this example 300, the NGAC graph 100 includes an all users node 304 that can be implemented in the user section 102 of the graph, and includes an all objects node 306 that can be implemented in the object section 104 of the graph. The all users node 304 can be used to designate some or all of the user elements 106 to each of the multiple policy classes. For example, the all users node 304 assigns both the user 110 and the application 112 (e.g., the user elements 106) to the policy class 120 via the exclusion default user node 124 and to the policy class 202 via the exclusion default user node 206. Similarly, the all objects node 306 can be used to designate some or all of the object elements 108 to each of the multiple policy classes. For example, the all objects node 306 assigns both the resource 114 and the service 116 (e.g., the object elements 108) to the policy class 120 via the exclusion default object node 122 and to the policy class 202 via the exclusion default object node 204.

In this configuration, the user elements 106 that represent the users (e.g., the user 110 and the application 112) in the user section 102 of the NGAC graph 100 can each be assigned as a member of the all users node 304. Additionally, the all users node 304 is assigned as a member of the exclusion default user node 124 of the policy class 120, and as a member of the exclusion default user node 206 of the policy class 202. Similarly, the object elements 108 that represent the resources (e.g., the resource 114 and the service 116) in the object section 104 of the NGAC graph 100 can each be assigned as a member of the all objects node 306. Additionally, the all objects node 306 is assigned as a member of the exclusion default object node 122 of the policy class 120, and as a member of the exclusion default object node 204 of the policy class 202. In this example, the all objects node 306 is an object attribute that is usable to accommodate many different types of the object elements 108 in the NGAC graph 100.

In this example 300, the NGAC graph 100 is also implemented with a policy node 308, which is modeled in the user section 102 of the graph, and is associated with the policy class 120. Any number of the user elements 106 that each represent one of the various users in the user section 102 of the graph can be assigned as a member of the policy node 308, such as the user 302 shown assigned at 310 as a member of the policy node 308. Additionally, the policy node 308 is assigned at 312 as a member of the policy class 120, which provides that the policy node 308 and the user 302 (e.g., via the policy node 308) are both contained by the policy class 120.

Figure 4:
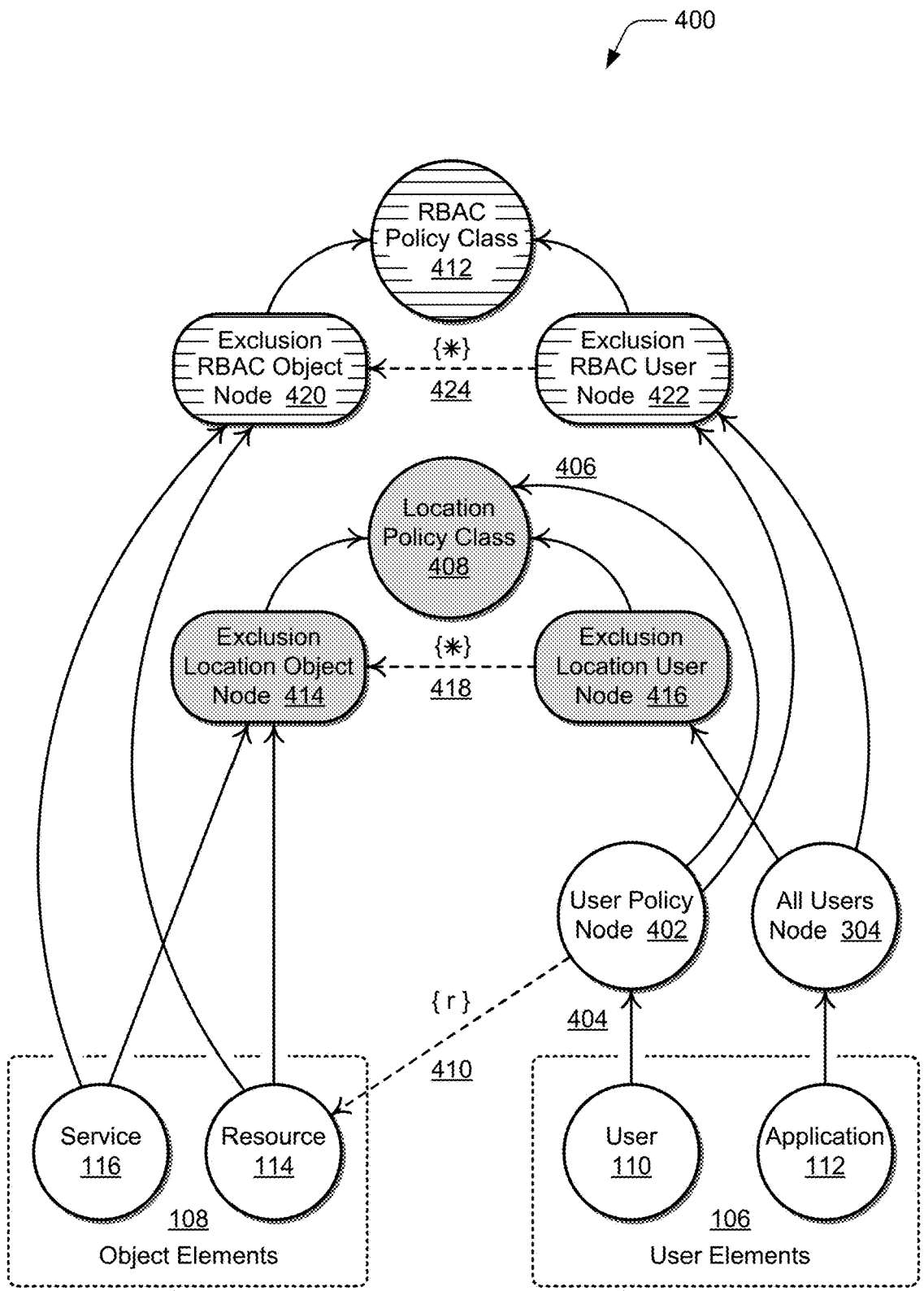
FIG. 4 further illustrates an example of the NGAC graph that includes graph features in accordance with one or more implementations of the repeatable NGAC policy class structure.

FIG. 4 further illustrates an example 400 of the next generation access control (NGAC) graph 100 that includes additional graph features, as generally described in context of the repeatable NGAC policy class structure. As shown and described with reference to FIGS. 1-3, the NGAC graph 100 includes the user elements 106, the object elements 108, and the all users node 304. In this example 400, the NGAC graph 100 is also implemented with a user policy node 402, which is modeled in the user section 102 of the graph. Any number of the user elements 106 that each represent one of the various users in the user section 102 of the graph can be assigned as a member of the user policy node 402, such as the user 110 shown assigned at 404 as a member of the user policy node 402. Additionally, the user policy node 402 is assigned at 406 as a member of a location policy class 408, which provides that the user policy node 402 and the user 110 (e.g., via the user policy node 402) are both contained by the location policy class 408.

An association 410 provides that the user policy node 402 grants read access on the resource 114 for the user 110 to perform a read operation on the contents of the resource. As noted above, the user policy node 402 and the user 110 are both contained by the location policy class 408. Accordingly, it can be determined that an access control permission for the user 110 to access the resource 114 is specifically provided by the user policy node 402 of the location policy class 408. Notably, the association 410 provides that the user policy node 402 grants read access on the resource 114 for the user 110 to perform a read operation on the contents of the resource 114.

In this example 400, the NGAC graph 100 is shown implemented with multiple, different policy classes that have been configured in the graph utilizing the composable policy class structure 118, which is repeatable to instantiate each of the multiple policy classes. The NGAC graph 100 in this example includes the location policy class 408 and a role-based access control (RBAC) policy class 412. The location policy class 408 designates policy and access control permissions to the object elements 108 according to different geographic locations of the various object elements, such as the resource 114 and the service 116. The RBAC policy class 412 designates policy based on roles of the user elements 106, and models access control permissions on the object elements 108 based on roles of the user elements.

As modeled utilizing the composable policy class structure 118, the location policy class 408 has an associated object attribute, which is the exclusion location object node 414 instantiated in the object section 104 of the NGAC graph 100. The location policy class 408 also has an associated user attribute, which is the exclusion location user node 416 instantiated in the user section 102 of the NGAC graph. The exclusion location object node 414 and the exclusion location user node 416 are each assigned as members of the location policy class 408. Additionally, an association 418 indicates that the object elements 108 associated contained as members of the exclusion location object node 414 grant all of the location policy permissions to the user elements 106 that are contained as members of the exclusion location user node 416.

Similarly, as modeled utilizing the composable policy class structure 118, the RBAC policy class 412 has an associated object attribute, the exclusion RBAC object node 420 instantiated in the object section 104 of the NGAC graph 100. The RBAC policy class 412 also has an associated user attribute, the exclusion RBAC user node 422 instantiated in the user section 102 of the NGAC graph. The exclusion RBAC object node 420 and the exclusion RBAC user node 422 are each assigned as members of the RBAC policy class 412. Additionally, an association 424 indicates that the object elements 108 contained as members of the exclusion RBAC object node 420 grant all of the policy permissions to the user elements 106 that are contained as members of the exclusion RBAC user node 422.

Figure 5:
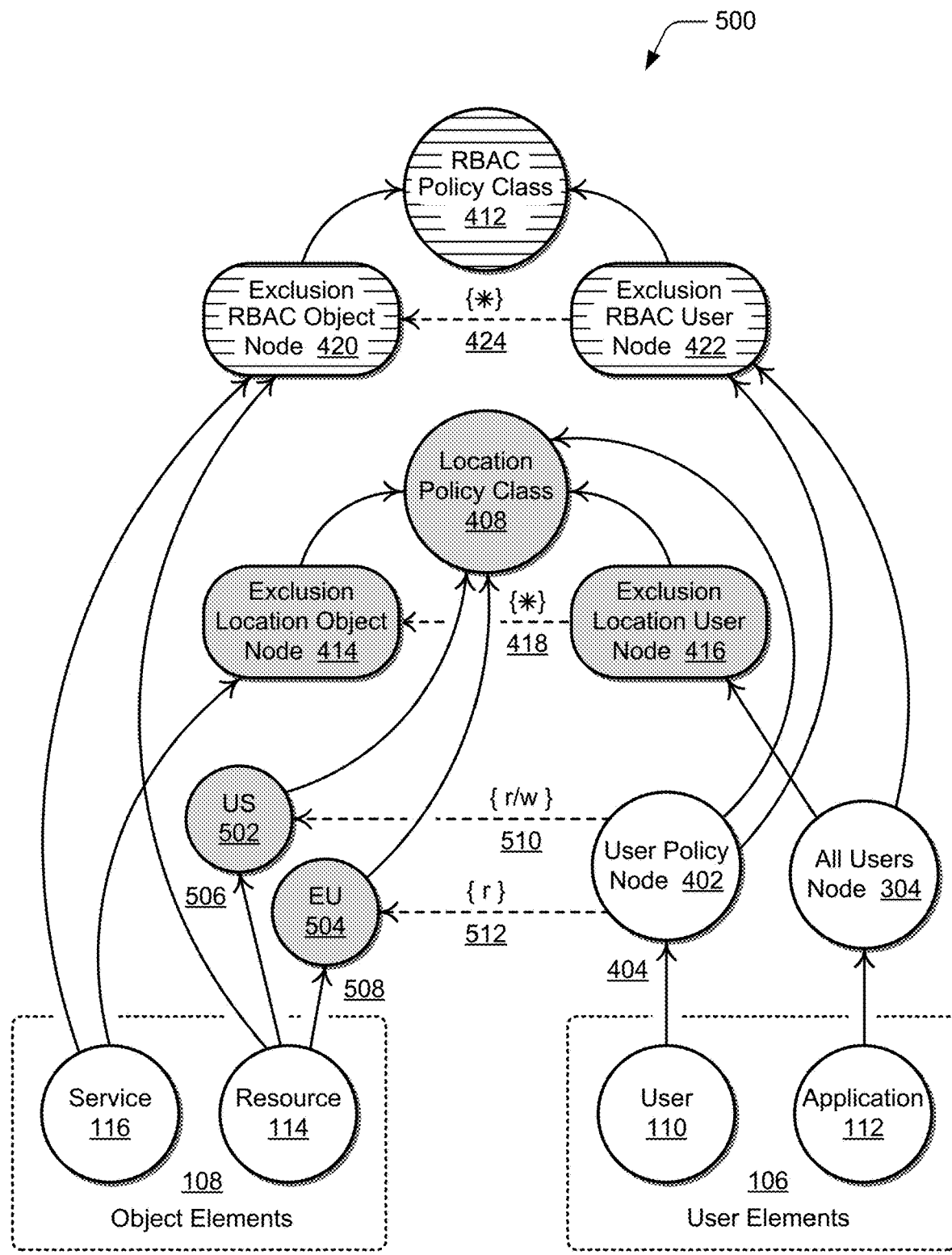
FIG. 5 further illustrates an example of the NGAC graph that includes additional graph features in accordance with one or more implementations of the repeatable NGAC policy class structure.

FIG. 5 further illustrates an example 500 of the next generation access control (NGAC) graph 100 that includes additional graph features, as generally described in context of the repeatable NGAC policy class structure. As shown and described with reference to FIGS. 1-4, the NGAC graph 100 includes the user elements 106 and the object elements 108, as well as the all users node 304 and the user policy node 402. In this example 500, the NGAC graph 100 is also implemented with additional object attributes that are modeled in the object section 104 of the graph, such as a US location node 502 and an EU location node 504. In this example, the US location node 502 is representative of one or more designated resources that can be accessed as a United States (US) resource according to the enforceable access criteria established by the location policy class 408. Similarly, the EU location node 504 is representative of one or more designated resources that can be accessed as a European Union (EU) resource according to the enforceable access criteria established by the location policy class 408.

In this example 500, the NGAC graph 100 includes the location policy class 408 and the role-based access control (RBAC) policy class 412, and could be implemented to control permissions and user access to resources, depending on United States and European Union privacy concerns. Generally, the resources (e.g., as represented by the object elements 108), such as medical records, banking records, user profiles, and any other types of digitally stored documents and information may include personal user information subject to privacy regulations. Notably, these privacy regulations can vary across countries, regions, and/or jurisdictions. However, these types of resources and data are likely to be transmitted via networks, such as over the Internet, and stored in data stores on an international scale, such as Worldwide in the "cloud" on cloud-based storage that may be physically located throughout the World. Accordingly, privacy regulations mandate and seek to restrict who (users) or what (client applications) can access and use these types of resources, based not only on specific roles of the users and client applications (e.g., the user elements 106), but also based on geophysical location of the users and/or the stored resources.

For example, the General Data Protection Regulation (GDPR) is a regulation that mandates data protection and privacy in the EU, as well as addresses the transfer of personal data outside of the EU. Organizations that process, store, and/or utilize personal user information are required to take the appropriate technical and organizational measures to implement the data protection and privacy standards and regulations. Additionally, the California Consumer Privacy Act (CCPA) is another similar regulation standard that could be modeled with the NGAC graph 100 to control permissions and user access to resources. With reference to the NGAC graph 100, the location policy class 408 designates policy and access control permissions to the object elements 108 according to different geographic locations of the various object elements, such as the resource 114 and the service 116. The RBAC policy class 412 designates policy based on roles of the user elements 106, and models access control permissions on the object elements 108 based on roles of the user elements.

Any number of the object elements 108 that each represent one of the various resources in the object section 104 of the NGAC graph 100 can be assigned as a member of the US location node 502 and/or as a member of the EU location node 504. For example, the resource 114 is shown assigned at 506 as a member of the US location node 502, and assigned at 508 as a member of the EU location node 504. An association 510 provides that the user policy node 402 grants access permissions on the object elements 108 that are members of the US location node 502 for user elements 106 that are members of the user policy node 402. For example, the user policy node 402 grants read and write access on the resource 114 in the US for the user 110 to perform read and write operations on the contents of the resource, as established by the location policy class 408.

Similarly, an association 512 provides that the user policy node 402 grants access permissions on the object elements 108 that are members of the EU location node 504 for user elements 106 that are members of the user policy node 402. For example, the user policy node 402 grants read access on the resource 114 in the EU for the user 110 to perform a read operation on the contents of the resource, as established by the location policy class 408. In this example, the user 110 on the user side of the NGAC graph 100 is assigned to the location policy class 408 via user attributes, namely the user policy node 402 of the location policy class. The user 110 can access the resource 114 via the user policy node 402 and the object attributes because the resource 114 on the object side of the NGAC graph 100 is also contained by the location policy class 408 via object attributes, namely the US location node 502 and/or the EU location node 504.

Additionally, the user 110 has the read access permission on the resource 114 in the EU, and has the read and write access permissions on the resource 114 in the US under the RBAC policy class 412. The user 110 is contained by the RBAC policy class 412 via a user attribute, namely the user policy node 402 and the exclusion RBAC user node 422 of the RBAC policy class. Similarly, the resource 114 is contained by the RBAC policy class 412 via an object attribute, namely the exclusion RBAC object node 420 of the RBAC policy class. This is an example implementation of a strict access evaluation mode of the NGAC graph 100, in that the user 110 can access the resource 114 via the user policy node 402 and the object attributes because both the user 110 and the resource 114 are members of both the location policy class 408 and the RBAC policy class 412.

Figure 6:
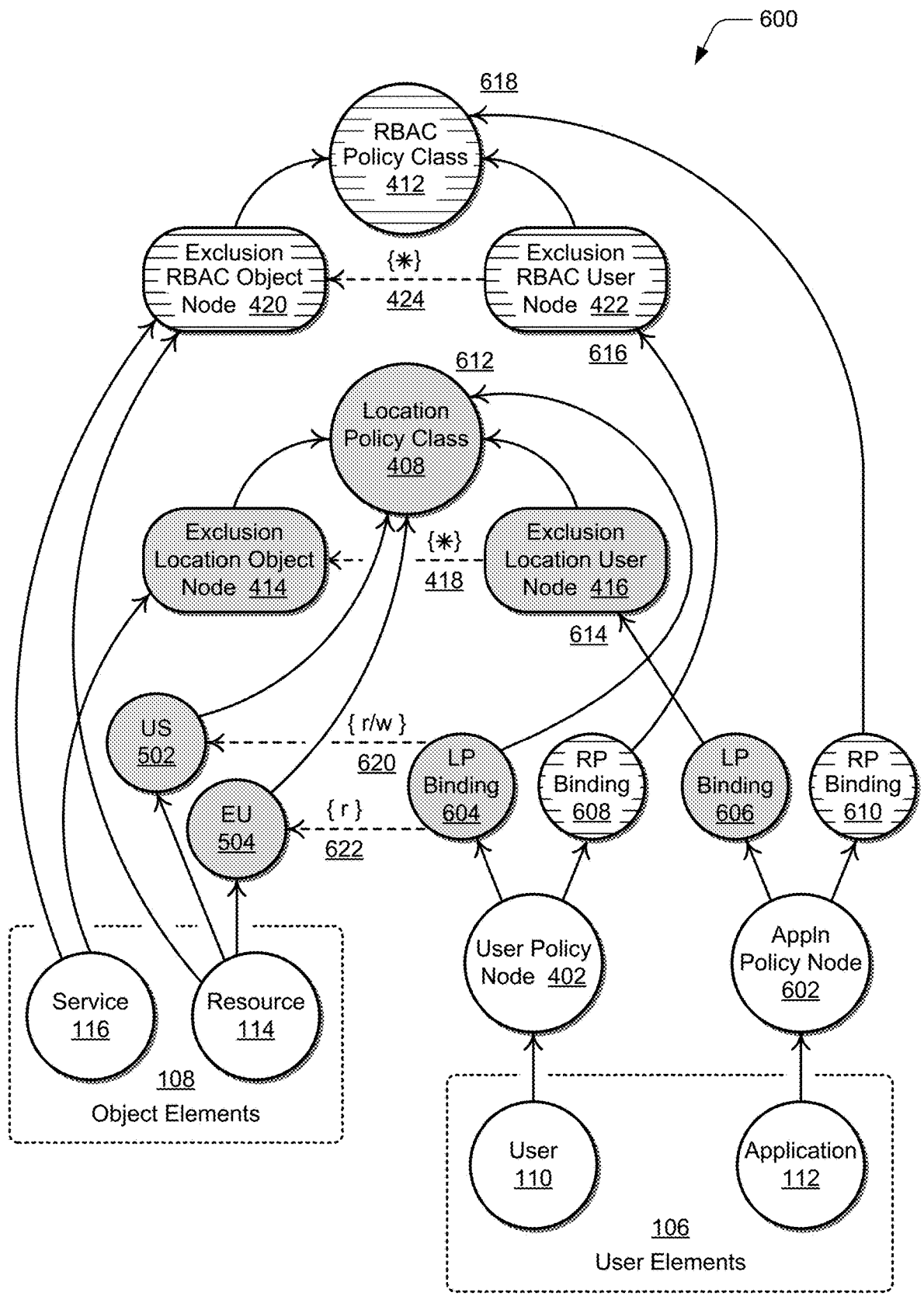
FIG. 6 further illustrates an example of the NGAC graph that includes additional graph features in accordance with one or more implementations of the repeatable NGAC policy class structure.

FIG. 6 further illustrates an example 600 of the next generation access control (NGAC) graph 100 that includes additional graph features, as generally described in context of the repeatable NGAC policy class structure. As shown and described with reference to FIGS. 1-5, the NGAC graph 100 includes the user elements 106 and the object elements 108, as well as the user policy node 402, the US location node 502, and the EU location node 504. Similar to the user policy node 402, the NGAC graph 100 also includes an application policy node 602. In this example 600, the NGAC graph 100 is also implemented with additional user attributes that are modeled in the user section 102 of the graph as separable policy bindings, such as location policy (LP) bindings 604, 606 and RBAC policy (RP) bindings 608, 610. As described herein, the policy bindings are NGAC graph nodes, and are also referred to as policy binding nodes. The separable policy bindings avoid using the user policy node 402 as the single access point for user 110 to both the US location node 502 and an EU location node 504, as shown in the FIG. 5 configuration of the NGAC graph 100, which may lead to unintentionally granting a user element 106 access to one or both of the location policy nodes.

Each of the separable policy bindings 604-610 correspond to one of the multiple policy classes, and are assigned to the corresponding policy class. For example, the location policy (LP) binding 604 is assigned at 612 to the location policy class 408, and the location policy (LP) binding 606 is assigned at 614 to the location policy class 408 via the exclusion location user node 416. Similarly, the RBAC policy (RP) binding 608 is assigned at 616 to the exclusion RBAC user node 422 of the RBAC policy class 412, and the RBAC policy (RP) binding 610 is assigned at 618 to the RBAC policy class 412. In practice, the NGAC graph 100 can be implemented so that for every policy class, there is at least one associated binding node. Notably, given a policy node, it will have a separable binding node (also referred to as a sub-binding node) for each policy class that exists in the NGAC graph.

In this example, the user policy node 402 is assigned to the separable policy bindings for each of the policy classes in the user section of the NGAC graph. For example, the user policy node 402 is shown assigned and as a member of the location policy (LP) binding 604 and the RBAC policy (RP) binding 608. Similarly, the application policy node 602 is shown assigned and as a member of the location policy (LP) binding 606 and the RBAC policy (RP) binding 610. Notably, the binding nodes can be created for every existing policy class in the graph, and they may be directly assigned to the corresponding policy class and/or to the exclusion user node for the corresponding policy class.

Additionally, an association 620 indicates that the resource 114 grants policy permissions on the object element 108 that represents the resource 114 for user elements 106 that are members of the user policy node 402, which is itself assigned to the LP binding 604. For example, the resource 114 grants read and write access on the object element 108 that represents the resource 114 for the user 110 to perform read and write operations on the contents of the resource via the association 620, as established by the location policy class 408. Similarly, an association 622 provides that the user policy node 402 grants access permissions (e.g., read access) on the object elements 108 that are members of the EU location node 504 for user elements 106 that are members of the user policy node 402. In this example, the user 110 on the user side of the NGAC graph is contained by the RBAC policy class 412 via user attributes, namely the RP binding 608 and the exclusion RBAC user node 422 of the RBAC policy class. Similarly, the application 112 can access the resource 114 via the RP binding 610 because the resource 114 on the object side of the NGAC graph is also contained by the RBAC policy class 412 via an object attribute, namely the exclusion RBAC object node 420 of the RBAC policy class.

In aspects of the repeatable NGAC policy class structure, as described herein, the configuration of the NGAC graph 100 provides for implementation of additional features, such as an explain feature, an audit feature, and a list feature. These features can be implemented as analysis queries of the NGAC graph 100, from which a policy author can determine specific permissions and access rights to the resources as granted by the object elements 108 for the users represented by the user elements 106. For example, an explain analysis or query can be initiated to determine what type of resource access a user element 106 may be granted according to the policy permissions if the user element 106 is assigned to a particular user attribute in the user section 102 of the NGAC graph. Similarly, an audit analysis or query can be initiated to determine why a particular user element 106 was granted resource access to an object element 108 after the fact, such as to determine which combination of the multiple policy classes in the NGAC graph 100 allowed an unintended resource access by a user element. Accordingly, the policy author can initiate an audit analysis or query to ascertain how an access control decision was determined based on the multiple policy configuration of the NGAC graph. Similarly, the policy author can initiate a list analysis or query to forecast how an access control decision will be determined for a user element 106 that requests access to an object element 108, prior to the actual request.

Given the novel configuration of the NGAC graph 100 as configured in aspects of the repeatable NGAC policy class structure as described herein, the various assignments and associations of the user elements 106 and the object elements 108 in the multiple policy configuration of the NGAC graph can be read semantically, directly from the graph to facilitate formulating and ascertaining an explain, audit, and/or list analysis or query. In practice, the policy author can independently determine which policy class (or combination of the policies) allowed a user to access a resource or service in the NGAC graph, and secondly, which policy class (if any) was supposed to allow the user to access the resource or the service in the graph.

As indicated above, a list feature can also be implemented as an analysis or query of the NGAC graph 100, from which a policy author can determine specific permissions and access rights to the resources as granted by the object elements 108 for the users represented by the user elements 106. For example, a list analysis or query can be initiated as independent questions that utilize the bifurcated configuration of the NGAC graph 100, notably to determine what set of associations does a particular user element 106 have in the graph, and what set of associations does a particular object element 108 have in the graph. The user section 102 of the NGAC graph can be evaluated (also commonly referred to as "walked" in graph terms), and independently, the object section 104 of the graph can be evaluated. The sets of associations determined from the two sides of the NGAC graph can then be evaluated to determine the access control decisions that would be determined based on the configuration of the NGAC graph.

Accordingly, the policy author can initiate a list analysis or query to obtain a list of all the object elements 108 that a user element 106 has permission to access based on the multiple policy configuration of the NGAC graph. For example, a list analysis or query may be initiated to determine all of the resources and services (e.g., as represented by the object elements 108) that the user 110 has permission to access in the US location at the US location node 502. Another list analysis or query may return a different set of objects for a query initiated to determine all of the resources and services that the user 110 has permission to access in the EU location at the EU location node 504. Similarly, the policy author can initiate a list query to obtain a list of all the user elements 106 that have permissions to access an object element 108 based on the multiple policy configuration of the NGAC graph. For example, a list analysis or query may be initiated to determine all of the users (e.g., as represented by the user elements 106) that have permissions to access the resource 114. Another list analysis or query may return a different set of objects for an analysis or query initiated to determine all of the users that have permissions to access the service 116.

Figure 7:
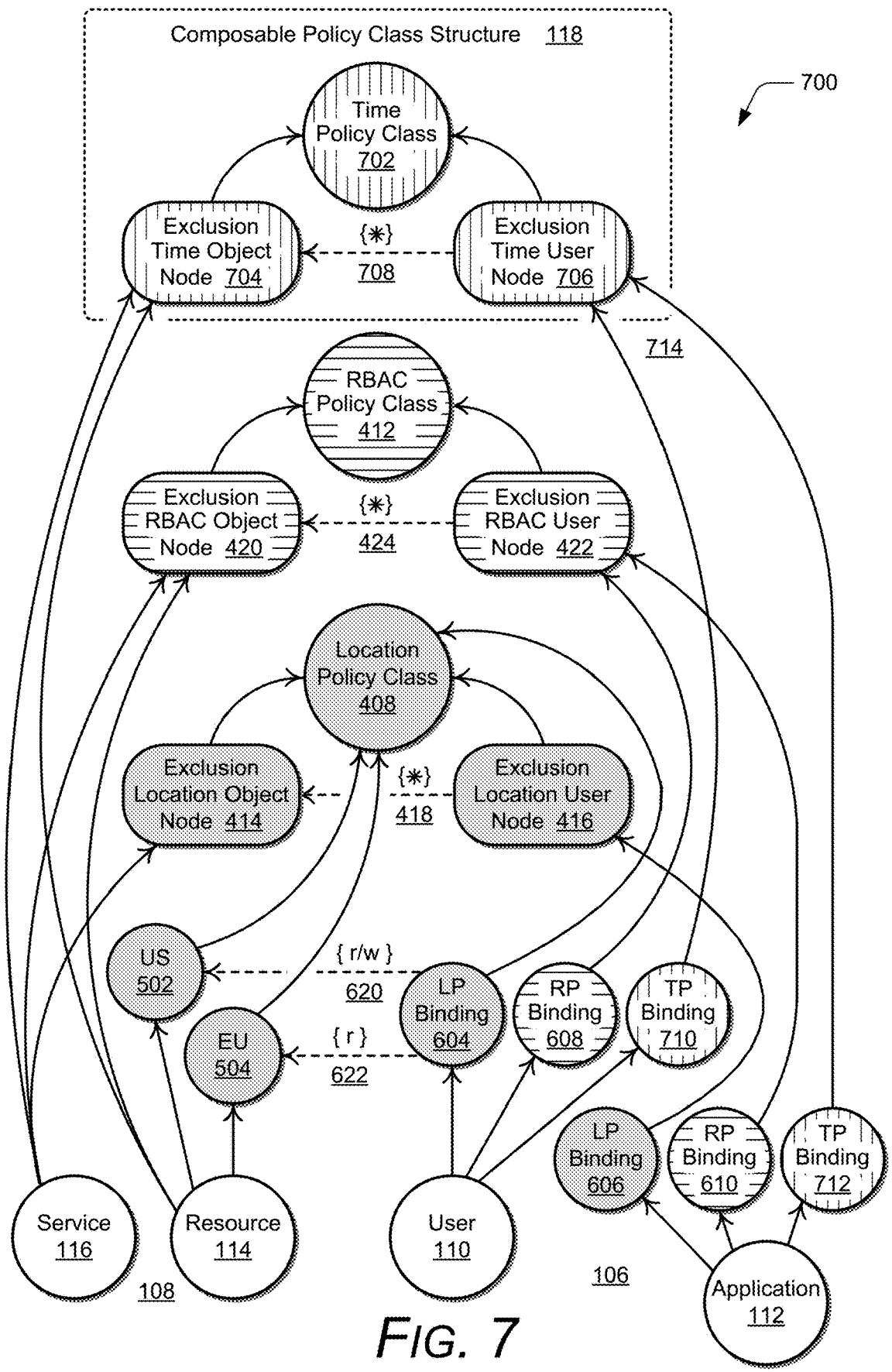
FIG. 7 further illustrates an example of the NGAC graph that includes additional graph features in accordance with one or more implementations of the repeatable NGAC policy class structure.

FIG. 7 further illustrates an example 700 of the next generation access control (NGAC) graph 100 that includes additional graph features, as generally described in context of the repeatable NGAC policy class structure. As shown and described with reference to FIGS. 1-6, the NGAC graph 100 includes the user elements 106 and the object elements 108, as well as the US location node 502, the EU location node 504, and the separable policy bindings (e.g., the LP bindings 604, 606 and the RP bindings 608, 610). Although not shown in this example 700, the NGAC graph may also be implemented with the user policy node 402 and the application policy node 602 (or similar) as shown and described with reference to FIG. 6. In this example, the composable policy class structure 118 is utilized to implement a time policy class 702 added to the NGAC graph 100 that is shown and described with reference to FIG. 6. This adds a temporal aspect to the access control decisions that are computed using the NGAC graph based on a strict access evaluation mode that takes into account an intersection of all of the access control policy permissions designated by the combination of the multiple policy classes.

The composable policy class structure 118 includes the time policy class 702, as well as an exclusion time object node 704 of the time policy class instantiated in the object section 104 of the NGAC graph. Similarly, the composable policy class structure 118 includes an exclusion time user node 706 of the time policy class 702 instantiated in the user section 102 of the NGAC graph. The exclusion time object node 704 and the exclusion time user node 706 are each assigned as members of the time policy class 702. An association 708 indicates that the object elements 108 contained as members of the exclusion time object node 704 grant all of the time policy permissions to the user elements 106 that are contained as members of the exclusion time user node 706. Additionally, the NGAC graph 100 includes time policy (TP) bindings 710, 712 that correspond to the time policy class 702 and are assigned at 714 to the time policy class. Notably, the separable policy class bindings (e.g., the LP bindings 604, 606; the RP bindings 608, 610; and the TP bindings 710, 712) allow a policy class author to properly compose the policies with specific permissions on each type of different policy class, effectively providing disjoint permissions for every policy class.

In this example, the composable policy class structure 118 provides a safe way to introduce the new time policy class 702 into the NGAC graph 100 without affecting or breaking the other policy class that have already been modeled in the graph, such as the location policy class 408 and the RBAC policy class 412. Notably, the NGAC specification does not specify or detail any such graph configuration to implement or model NGAC. The configuration of the repeatable NGAC policy class structure as described herein also provides for reusing current NGAC graph nodes that already exist in the graph when adding a new policy class to the graph.

Additionally, reusing current graph nodes can prevent or reduce the problems of exponential node expansion that is inherent in other types of access control systems, such as RBAC, leading to improved computational speed when computing an access control decision, and reduced memory storage space needed to save the overall instantiation of the NGAC graph. For example, the NGAC graph 100 already includes the LP binding 604 via which the user 110 can access the resource 114 via the US location node 502 with read and write permissions. The new time policy class 702 and the separable TP bindings 710, 712 can be added into the NGAC graph 100 without needing to also generate additional user attributes that facilitate the location-based policies already present in the graph. Accordingly, the NGAC graph 100 does not exponentially expand by having to add additional user attributes and object attributes with the addition of new policy classes, which can quickly become unmanageable.

In this example 700, the location policy class 408, the RBAC policy class 412, and the time policy class 702 are the combined enforceable access criteria by which the user elements 106 that represent the users are allowed or denied access to the object elements 108 that represent the resources. An access control decision determined based on the combined, multiple policy classes is an example of a strict access evaluation mode of the NGAC graph 100, in that the user 110 can access the resource 114 via the LP binding 604 and the location object attributes because both the user 110 and the resource 114 are members of the location policy class 408, the RBAC policy class 412, and the time policy class 702. Together, the multiple policy classes (e.g., the location policy class 408, the RBAC policy class 412, and the time policy class 702) provide the enforceable access criteria by which the user elements 106 that represent the users are allowed or denied access to the object elements 108 that represent the resources and/or services.

Figure 8:
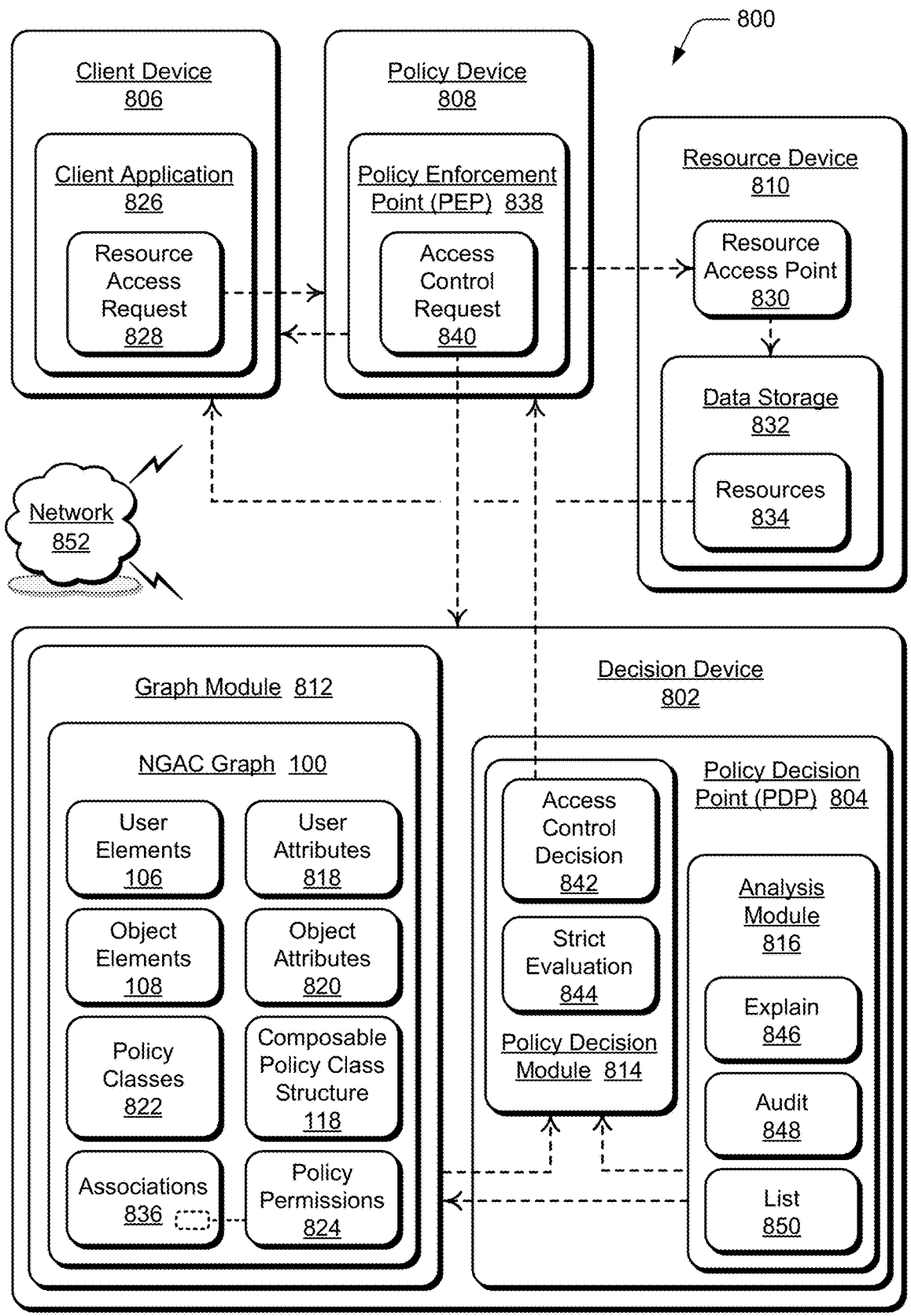
FIG. 8 an example environment in which aspects of the repeatable NGAC policy class structure can be implemented.

FIG. 8 illustrates an example computing environment 800 in which aspects of a repeatable NGAC policy class structure can be implemented in an NGAC graph, as described herein. In practice, the example computing environment 800 may represent an implementation, or partial implementation, of a service mesh architecture. Alternatively, the example computing environment 800 is representative of any type of an access control system, such as in the context of information security. The example environment 800 includes several computing devices, including a decision device 802 generally implemented as a policy decision point (PDP) 804. The various computing devices of the example computing environment 800 include a client device 806, a policy device 808, and a resource device 810, as well as the decision device 802, all of which can be implemented as any type of a computing device, a server device, or a combination of multiple devices implemented in a computing architecture.

In this example computing environment 800, the various computing devices may each include any number and combination of different components as further described with reference to the example device shown in FIG. 11. For example, the various computing devices generally include memory and a processor, as well as any type of data storage that may be implemented as any suitable memory, memory device, or electronic data storage. Although shown and described as separate, independent computing devices in the example environment 800, any one or more of the decision device 802, the client device 806, the policy device 808, and the resource device 810 may be combined and implemented together as one computing or server device. Alternatively, any one or more of the various computing devices may be implemented as a combination of multiple computing and/or server devices.

The decision device 802 implements a graph module 812, as well as a policy decision module 814 and an analysis module 816 within the PDP 804. Any one of the graph module 812, the policy decision module 814, and the analysis module 816 can be implemented as a separate module that includes independent processing, memory, and/or logic components functioning as a computing and/or electronic device integrated with the decision device 802. Alternatively or in addition, any one of the modules can be implemented in software, in hardware, or as a combination of software and hardware components. In this example, the graph module 812, the policy decision module 814, and the analysis module 816 are implemented as software applications or modules, such as executable software instructions (e.g., computer-executable instructions) that are executable with a processing system of the decision device 802 to implement the techniques and features of the repeatable NGAC policy class structure, as described herein.

As a software application or module, the graph module 812, the policy decision module 814, and/or the analysis module 816 can be stored in memory on the decision device 802, or in any other suitable memory device or electronic data storage implemented with the respective modules, or remote from the decision device. Alternatively or in addition, any one of the graph module 812, the policy decision module 814, and/or the analysis module 816 may be implemented in firmware and/or at least partially in computer hardware. For example, at least part of a module may be executable by a computer processor, and/or at least part of the module may be implemented in logic circuitry.

In aspects of the described implementations, the graph module 812 at the decision device 802 can generate the NGAC graph 100 as shown and described with reference to FIGS. 1-7. The graph module 812 can generate the NGAC graph 100 having the bifurcated structure with the user section 102 of the graph and the object section 104 of the graph. The graph module 812 can model the user entities as the user elements 106 in the user section 102 of the graph, and the user entities can be identified in the system with unique user identifiers. Similarly, the graph module 812 can model the resource entities as the object elements 108 in the object section 104 of the graph, and the resource entities can be identified in the system with unique object identifiers. In addition to the user elements 106 and the object elements 108, the graph module 812 can model the NGAC graph 100 in NGAC convention to include the different types of nodes, such as the user attributes 818, the object attributes 820, and the multiple policy classes 822.

The user elements 106 represent any type of user entity, such as the user 110 or the application 112, that can request access to the resources based on access criteria and policy permissions 824 established by the multiple policy classes 822. In this example environment 800, the client device 806 implements a client application 826 as an example of a user entity (e.g., the application 112) that may initiate a resource access request 828 to access, obtain, and/or edit a resource.

Additionally, the object elements 108 represent any type of resource entity, such as the resource 114 or the service 116, that is accessible by a user entity having allowable policy permissions 824, or is protected from user access by a user that does not have allowable access permissions. In this example environment 800, the resource device 810 implements a resource access point (RAP) 830 that manages data transfer and access to data storage 832 utilized to maintain resources 834, which is an example of a resource entity (e.g., the resource 114). The resource device 810 is representative of any type of network and/or cloud-based access site that provides a service and/or from which data and information is available, such as via the Internet, for online and/or network-based access. Additionally, the resource device 810 can be implemented as one or more hardware server devices (e.g., computing devices) in the computing environment and/or in a service mesh architecture, and may include the data storage 832 implemented as any suitable memory, memory device, or electronic data storage for network-based data storage.

In implementations, the graph module 812 utilizes the composable policy class structure 118 to configure the multiple policy classes 822 in the NGAC graph 100. Notably, the composable policy class structure 118 is repeatable, from which multiple policy classes can be instantiated in the NGAC graph 100, including different types of policy classes. As noted above, the multiple, different types of policy classes can include a location policy class, a role-based access control (RBAC) policy class, a time policy class, and/or any other type of policy class utilized in the context of an access control policy. Additionally, the graph module 812 can model the associations 836 of the composable policy class structure 118, and the associations are modeled to indicate the object elements 108 that grant policy permissions 824 to the user elements 106. Generally, the associations 836 are modeled as directed graph edges that represent and define the authorization of access rights between policy elements, such as for operations to read, write, create, and delete policy elements and relations.

In this example computing environment 800, the policy device 808 is generally implemented as a policy enforcement point (PEP) 838, which in the context of a service mesh architecture, is a proxy that executes for an application (e.g., is running on the policy device 808 for the client application 826). The PEP 838 is designed to enforce the policy permissions and access control decisions, as determined by the policy decision point (PDP) 804. The PEP 838 can receive the resource access request 828 from the client application 826 as a request to access an object element 108 of a resource 834. The PEP 838 can then communicate the resource access request 828 on behalf of the client application as an access control request 840, which is communicated to the policy decision point (PDP) 804 that is implemented by the decision device 802.

In other aspects of the described implementations, the policy decision module 814 of the policy decision point (PDP) 804 that is implemented by the decision device 802 can receive the access control request 840 from the PEP 838. The policy decision module 814 can then utilize the NGAC graph 100 to compute an access control decision 842. The access control decision 842 is computed across the multiple policy classes 822 of the NGAC graph, which provides a basis to evaluate whether the client application 826 is authorized to access the requested resource 834. In implementations, the policy decision module 814 can compute the access control decision 842 as a single access control decision across the different types of the multiple policy classes 822 in the NGAC graph. Further, the single access control decision 842 can be computed based on a strict evaluation mode 844 that is configured as an intersection of the policy permissions 824, as indicated by the associations 836 and granted by the object elements 108 to access the resources 834 for the user elements 106.

The PDP 804 can then initiate the decision device 802 to respond to the access control request 840 that was received from the PEP 838 by communicating the access control decision 842 back to the PEP 838 at the policy device 808. The access control decision 842 computed by the PDP 804 indicates whether to allow or deny the client application 826 access to the resource 834 based on the evaluation utilizing the NGAC graph 100. The PEP 838 at the policy device 808 can then either allow or drop the resource access request 828 from the client application 826 at the client device 806 based on the access control decision 842 received from the PDP 804. If the access control decision 842 indicates to allow the resource access request 828 from the client application 826, the PDP 804 can also initiate to return to the PEP 838 (e.g., via the respective computing devices), the location of the requested resource 834 in the data storage 832 at the resource device 810. The PEP 838 can also issue a command to the resource access point (RAP) 830 at the resource device 810 to execute the operation associated with the resource access request 828 on the resource 834.

In other aspects of the described implementations, the analysis module 816 of the policy decision point (PDP) 804 that is implemented by the decision device 802 can receive query or analysis requests, such as from a policy author who wants to query or analyze the NGAC graph 100 and determine specific permissions and access rights to the resources 834 as granted by the object elements 108 for the users represented by the user elements 106. For example, the analysis module 816 can initiate an explain 846 (e.g., as an analysis or query) of the NGAC graph 100 to determine what type of resource access a user element 106 may be granted according to the policy permissions 824 if the user element 106 is assigned to a particular user attribute 818 in the user section 102 of the NGAC graph 100. Similarly, the analysis module 816 can initiate an audit 848 (e.g., as an analysis or query) of the NGAC graph 100 to determine why a particular user element 106 was granted resource access to an object element 108 after the fact, such as to determine which combination of the multiple policy classes 822 in the NGAC graph allowed an unintended resource access by a user element.

Accordingly, a policy author can initiate the analysis module 816 to perform an explain 846 (e.g., as an analysis or query) on the NGAC graph 100 to forecast how an access control decision 842 will be determined for a user element 106 that requests access to an object element 108, prior to the actual request. Additionally, the policy author can initiate the analysis module 816 to perform an audit 848 (e.g., as an analysis or query) on the NGAC graph 100 to ascertain how an access control decision 842 was determined based on the multiple policy configuration of the NGAC graph 100.

Additionally, the analysis module 816 can initiate a list 850 (e.g., as an analysis or query) of the NGAC graph 100 to determine the set of associations 836 that a particular user element 106 has in the graph, and the set of associations that a particular object element 108 has in the graph. The user section 102 of the NGAC graph 100 can be evaluated (also commonly referred to as "walked" in graph terms), and independently, the object section 104 of the graph can be evaluated. The sets of associations determined from the two sides of the NGAC graph 100 can then be evaluated to determine the access control decisions 842 that would be determined based on the configuration of the NGAC graph. Accordingly, a policy author can initiate the analysis module to perform a list 850 on the NGAC graph 100 to obtain a list of all the object elements 108 that a user element 106 has permission to access based on the multiple policy configuration of the NGAC graph 100. The list 850 can also be performed on the NGAC graph 100 to obtain a list of all the user elements 106 that have permissions to access an object element 108 based on the multiple policy configuration of the NGAC graph.

Any of the devices, servers, and/or services described herein can communicate via a network 852, such as for data communication between the various computing devices in the example computing environment 800. The network 852 can be implemented to include wired and/or wireless networks. The network can also be implemented using any type of network topology and/or communication protocol, and can be represented or otherwise implemented as a combination of two or more networks, to include IP-based networks and/or the Internet. The network 852 may also include mobile operator networks that are managed by a mobile network operator and/or other network operators, such as a communication service provider, mobile phone provider, and/or Internet service provider.

Example methods 900 and 1000 are described with reference to respective FIGS. 9 and 10 in accordance with one or more aspects of repeatable NGAC policy class structure. Generally, any of the components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
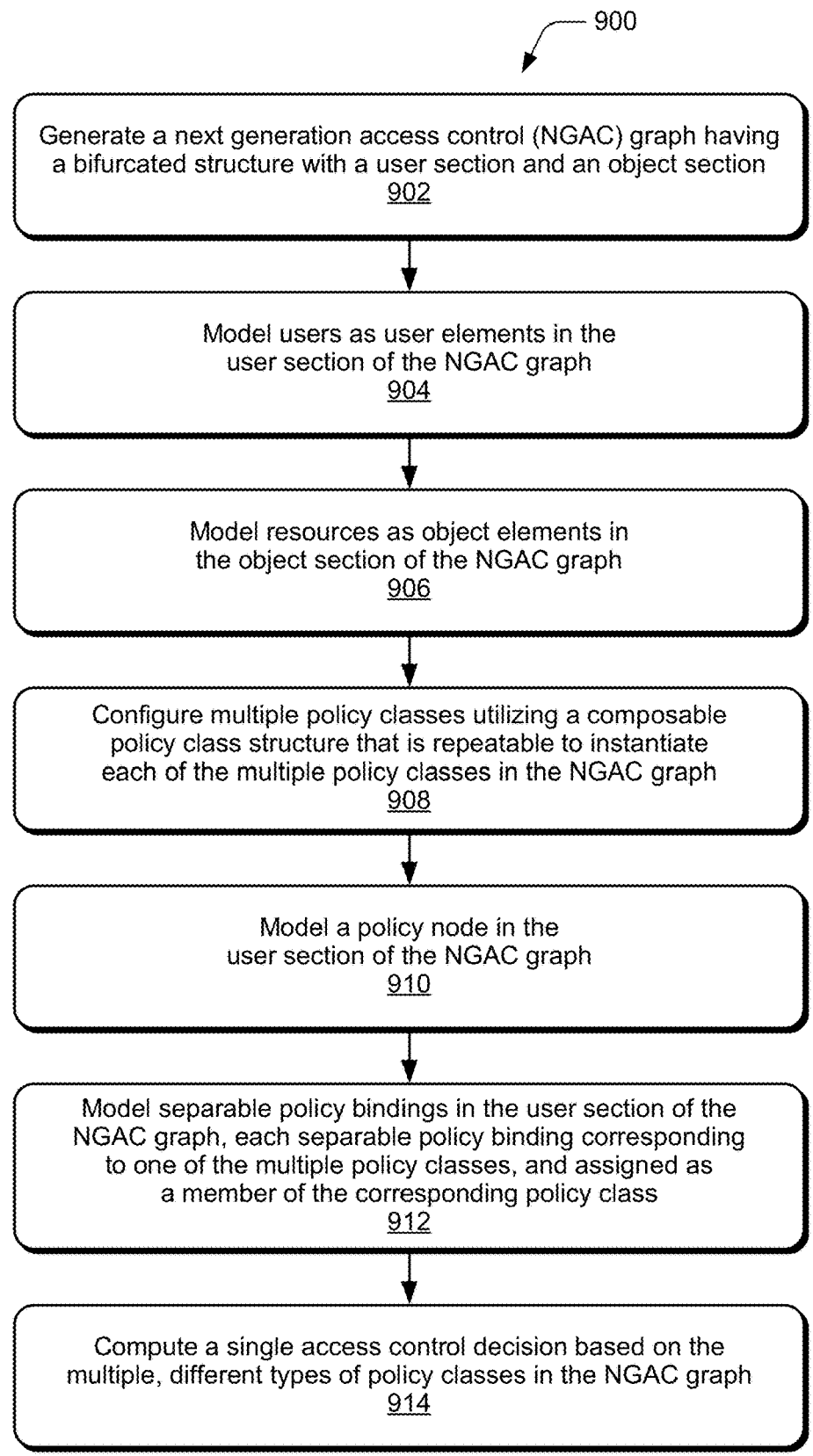
FIG. 9 illustrates an example method of a repeatable NGAC policy class structure in accordance with one or more implementations.

FIG. 9 illustrates example method(s) 900 for a repeatable NGAC policy class structure, as shown and described with reference to FIGS. 1-8, and is generally described with reference to the graph module and the policy decision module implemented by a computing device. The order in which the method is described is not intended to be construed as a limitation, and any number or combination of the method operations can be combined in any order to implement a method, or an alternate method.

At 902, a next generation access control (NGAC) graph is generated having a bifurcated structure with a user section and an object section. For example, the graph module 812 implemented by the decision device 802 can generate the NGAC graph 100 with the bifurcated structure having the user section 102 of the graph and the object section 104 of the graph. The sections of the NGAC graph 100 may also be referred to as the user side and the object side of the graph.

At 904, users are modeled as user elements in the user section of the NGAC graph. For example, the graph module 812 implemented by the decision device 802 can model the user entities as the user elements 106 in the user section 102 of the NGAC graph 100, and the graph can include any number of various different types of users, such as the user 110 and the application 112 as shown in the examples of the NGAC graph.

At 906, resources are modeled as object elements in the object section of the NGAC graph. For example, the graph module 812 implemented by the decision device 802 can model the resource entities as the object elements 108 in the object section 104 of the NGAC graph 100, and the graph can include any number and different types of resources, such as the resource 114 and the service 116 as shown in the examples of the NGAC graph.

At 908, multiple policy classes are configured utilizing a composable policy class structure that is repeatable to instantiate each of the multiple policy classes in the NGAC graph. For example, the graph module 812 implemented by the decision device 802 can configure the multiple policy classes 822 in the NGAC graph 100 utilizing the composable policy class structure 118 that is repeatable to instantiate each of the multiple policy classes in the graph. In implementations, the multiple, different types of policy classes 822 can include the location policy class 408, the role-based access control (RBAC) policy class 412, the time policy class 702, and/or any other type of policy class.

The composable policy class structure 118 includes the policy class 120 that is the enforceable access criteria by which the user entities are allowed or denied access to the resources 834. The composable policy class structure 118 also includes the exclusion default object node 122 of the policy class 120 instantiated in the object section 104 of the NGAC graph 100, and includes the exclusion default user node 124 of the policy class 120 instantiated in the user section 102 of the NGAC graph. The composable policy class structure 118 also includes the association 126 that indicates the object elements 108 contained as members of the exclusion default object node 122 granting all of the policy permissions of the policy class to the user elements 106 that are contained as members of the exclusion default user node 124. The policy permissions 824 indicated by the association 126 allow the user elements 106 to perform operations on contents of the object elements 108 that represent the resources.

In implementations, one or more of the user elements 106 that represent the user entities in the user section 102 of the NGAC graph 100 can each be contained as a member of the policy class 120 via the exclusion default user node 124 of the policy class 120. Similarly, one or more of the object elements 108 that represent the resource entities in the object section 104 of the NGAC graph 100 can each be contained as a member of the policy class 120 via the exclusion default object node 122 of the policy class 120. Notably, the composable policy class structure 118 is repeatable, from which the multiple policy classes 822 can be instantiated in the NGAC graph, including different types of policy classes, to compute an access control decision 842 using the NGAC graph.

At 910, a policy node is modeled in the user section of the NGAC graph. For example, the graph module 812 implemented by the decision device 802 can model the user policy node 402 in the user section 102 of the NGAC graph 100.

Any number of the user elements 106 that each represent a respective user entity in the user section 102 of the NGAC graph can be assigned as a member of the user policy node 402, such as the user 110 shown assigned as a member of the user policy node 402.

At 912, separable policy bindings are modeled in the user section of the NGAC graph, where each separable policy binding corresponds to one of the multiple policy classes, and is assigned as a member of the corresponding policy class. For example, the graph module 812 implemented by the decision device 802 can model the NGAC graph 100 with the separable policy bindings, such as the location policy (LP) bindings 604, 606; the RBAC policy (RP) bindings 608, 610; and/or the time policy (TP) bindings 710, 712. The separable policy bindings correspond to one of the multiple policy classes, and are assigned as a member of the corresponding policy class, such as the location policy (LP) bindings 604, 606 assigned to the location policy class 408; the RBAC policy (RP) bindings 608, 610 assigned to the RBAC policy class 412; and the time policy (TP) bindings 710, 712 assigned to the time policy class 702.

At 914, a single access control decision is computed based on the multiple, different types of policy classes in the NGAC graph. For example, the policy decision module 814 implemented by the decision device 802 can compute a single access control decision 842 based on the multiple, different types of policy classes 822 in the NGAC graph 100. In implementations, the single access control decision 842 is based on the strict evaluation mode 844, which is an intersection of the policy permissions 824 indicated by the associations 836 that correlate the user elements 106 with the object elements 108 in the NGAC graph.

Figure 10:
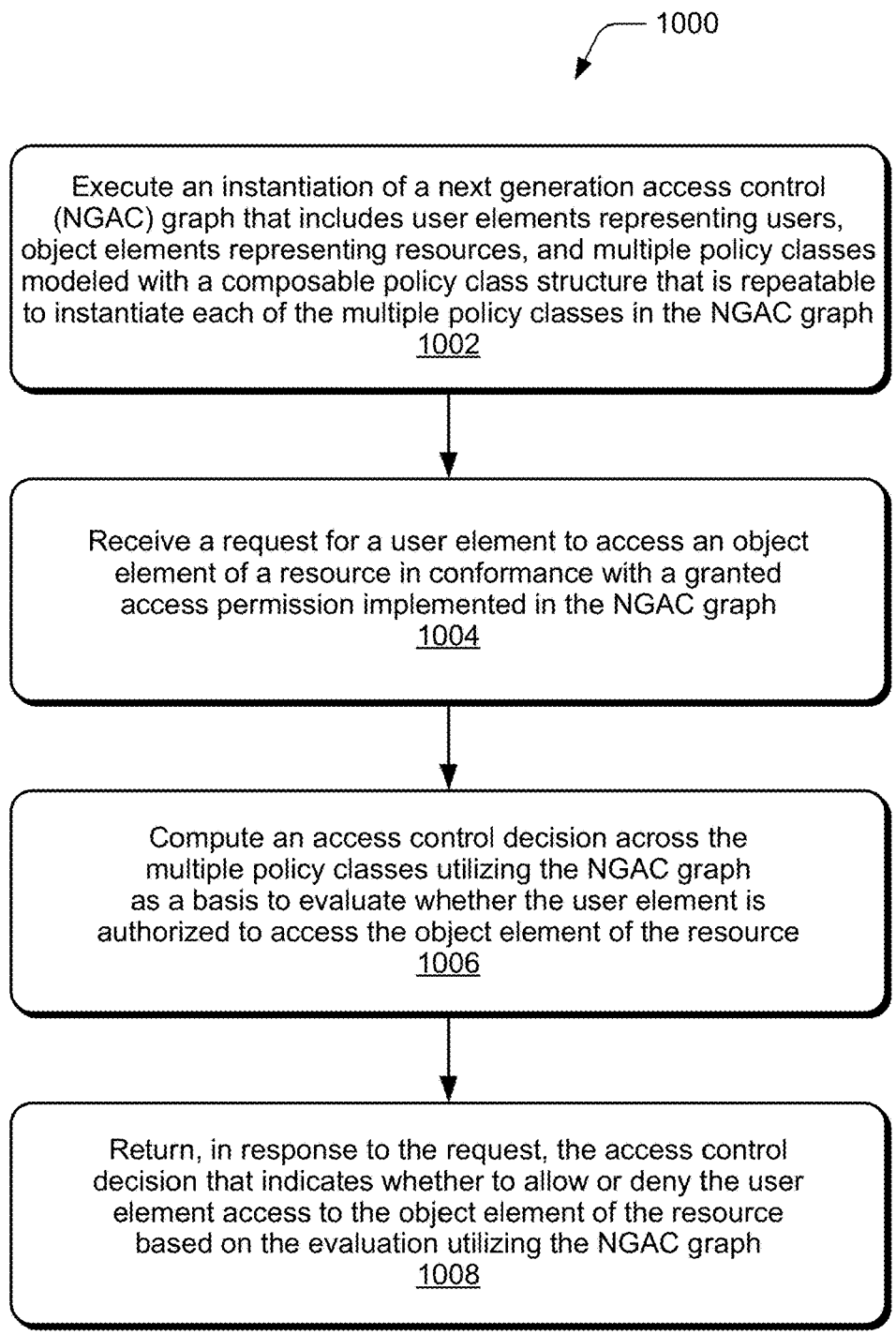
FIG. 10 illustrates another example method of a repeatable NGAC policy class structure in accordance with one or more implementations.

FIG. 10 illustrates example method(s) 1000 for a repeatable NGAC policy class structure, as shown and described with reference to FIGS. 1-8, and is generally described with reference to the policy decision module implemented by a computing device. The order in which the method is described is not intended to be construed as a limitation, and any number or combination of the method operations can be combined in any order to implement a method, or an alternate method.

At 1002, an instantiation of a next generation access control (NGAC) graph is executed, and the NGAC graph includes user elements representing users, object elements representing resources, and multiple policy classes modeled with a composable policy class structure that is repeatable to instantiate each of the multiple policy classes in the NGAC graph. For example, the policy decision module 814 implemented by the decision device 802 can utilize an instantiation of the NGAC graph 100 as generated by the graph module 812, and executable by a processor of the decision device 802. As shown and described with reference to FIGS. 1-9, the NGAC graph 100 can be implemented utilizing the composable policy class structure 118, which includes the policy class 120 that is the enforceable access criteria by which the user elements 106 are allowed or denied access to the object elements 108 that represent the resources 834.

The composable policy class structure 118 also includes the exclusion default object node 122 of the policy class 120, and the exclusion default user node 124 of the policy class. The composable policy class structure 118 also has the association 126 that indicates the object elements 108 associated contained as members of the exclusion default object node 122 granting all of the policy permissions of the policy class 120 to the user elements 106 that are contained as members of the exclusion default user node 124. The policy permissions indicated by the association 126 allow the user elements 106 to perform operations on contents of the object elements 108 that represent the resources. In implementations, one or more of the user elements 106 can each be contained as a member of the policy class 120 via the exclusion default user node 124 of the policy class. Similarly, one or more of the object elements 108 can each be contained as a member of the policy class 120 via the exclusion default object node 122 of the policy class.

The NGAC graph 100 can also include the separable policy bindings that each correspond to one of the multiple policy classes, such as the location policy (LP) bindings 604, 606; the RBAC policy (RP) bindings 608, 610, and/or the time policy (TP) bindings 710, 712. The separable policy bindings all correspond to one of the multiple policy classes, and are assigned to the corresponding policy class, such as the location policy (LP) bindings 604, 606 assigned to the location policy class 408; the RBAC policy (RP) bindings 608, 610 assigned to the RBAC policy class 412; and the time policy (TP) bindings 710, 712 assigned to the time policy class 702. The NGAC graph 100 can also include policy nodes, such as the user policy node 402 and the application policy node 602 implemented in the user section 102 of the NGAC graph. Any number of the user elements 106 that each represent a respective user entity in the user section 102 of the graph can be assigned as a member of the user policy node 402 and/or as a member of the application policy node 602, such as the user 110 shown assigned as a member of the user policy node 402.

At 1004, a request is received for a user element to access an object element of a resource in conformance with a granted access permission implemented in the NGAC graph. For example, the policy decision module 814 implemented by the decision device 802 can receive the access control request 840 for a user element 106 of a user entity (e.g., the client application 826) to access an object element 108 of a resource 834 in conformance with a granted access permission implemented in the NGAC graph 100.

At 1006, an access control decision is computed across the multiple policy classes utilizing the NGAC graph as a basis to evaluate whether the user element is authorized to access the object element of the resource. For example, the policy decision module 814 implemented by the decision device 802 can compute the access control decision 842 across the multiple policy classes 822 utilizing the NGAC graph 100 as a basis to evaluate whether the user element 106 is authorized to access the object element 108 of the corresponding resource 834. The access control decision 842 can be computed by the policy decision module 814 as a single access control decision across the different types of the multiple policy classes 822 in the NGAC graph, and the single access control decision 842 is based on the strict evaluation mode 844, which is an intersection of the policy permissions 824 indicated by the associations 836 that correlate the user elements 106 with the object elements 108. In implementations, the different types of the multiple policy classes 822 in the NGAC graph 100 can include the location policy class 408, the role-based access control (RBAC) policy class 412, the time policy class 702, and/or any other type of policy class in the NGAC graph.

At 1008, the access control decision is returned in response to the request, and the access control decision indicates whether to allow or deny the user element access to the object element of the resource based on the evaluation utilizing the NGAC graph. For example, the policy decision module 814 implemented by the decision device 802 can initiate to return the access control decision 842 in response to the access control request 840, and the access control decision 842 indicates whether to allow or deny the user element 106 access to the object element 108 of the resource 834 based on the evaluation utilizing the NGAC graph 100.

Figure 11:
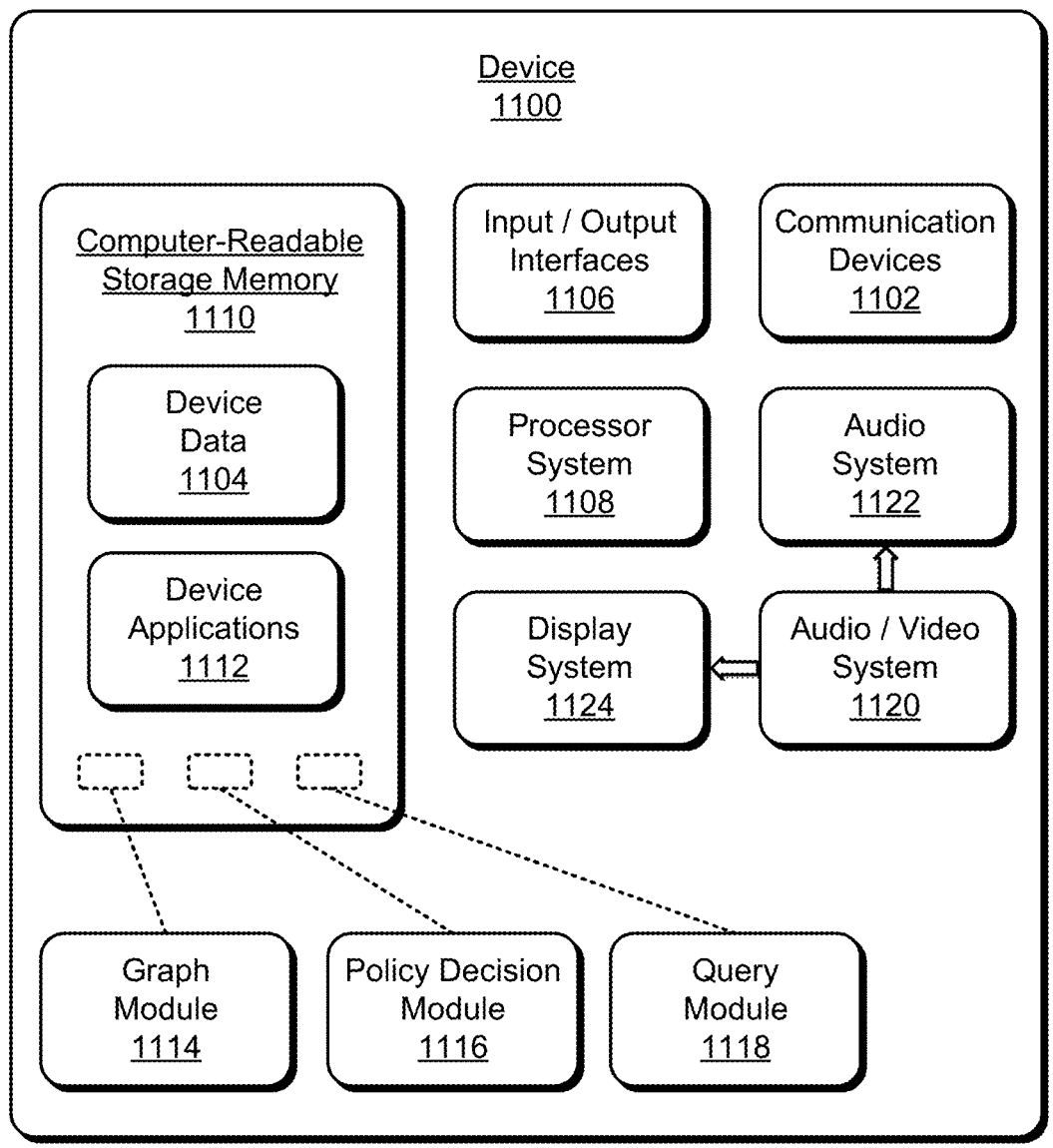
FIG. 11 illustrates an example system with an example device that can implement aspects of a repeatable NGAC policy class structure.

FIG. 11 illustrates an example device 1100, which can implement aspects of the techniques and features of a repeatable NGAC policy class structure, as described herein. The example device 1100 can be implemented as any of the devices, servers, or services described with reference to the previous FIGS. 1-10, such as any type of a computing device, or other computing and/or electronic device. For example, the decision device 802, the client device 806, the policy device 808, and the resource device 810 of the example computing environment 800 may each be implemented as the example device 1100.

The example device 1100 can include various, different communication devices 1102 that enable wired and/or wireless communication of device data 1104 with other devices, such as any of the NGAC graph data and resource information, as well as the computer data and content that is generated, processed, determined, received, stored, and/or transferred from one computing device to another, and/or synched between multiple computing devices. Generally, the device data 1104 can include any form of audio, video, image, graphics, and/or electronic data that is generated by applications executing on the device. The communication devices 1102 can also include transceivers for cellular phone communication and/or for network data communication.

The example device 1100 can also include various, different types of input/output (I/O) interfaces 1106, such as data network interfaces that provide connection and/or communication links between the devices, data networks, and other devices. The I/O interfaces can be used to couple the device to any type of components, peripherals, and/or accessory devices, such as a computer input device that may be integrated with the example device 1100. The I/O interfaces may also include data input ports via which any type of data, information, media content, and/or inputs can be received, such as user inputs to the device, as well as any type of audio, video, image, graphics, and/or electronic data received from any content and/or data source.

The example device 1100 includes a processor system 1108 that may be implemented at least partially in hardware, such as with any type of microprocessors, controllers, and the like that process executable instructions. The processor system 1108 can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The example device 1100 may further include any type of a system bus or other data and command transfer system that couples the various components within the device. A system bus can include any one or combination of different bus structures and architectures, as well as control and data lines.

The example device 1100 also includes computer-readable storage memory 1110 (e.g., memory and/or memory devices), such as data storage devices implemented in hardware that can be accessed by a computing device, and that provide persistent storage of data and executable instructions (e.g., software applications, modules, programs, functions, and the like). Examples of computer-readable storage memory 1110 include volatile memory and non-volatile memory, fixed and removable media devices, and any suitable memory device or electronic data storage that maintains data for computing device access. The computer-readable storage memory 1110 can include various implementations of random-access memory (RAM), read-only memory (ROM), flash memory, and other types of storage media in various memory device configurations. The example device 1100 may also include a mass storage media device.

The computer-readable storage memory 1110 provides storage of the device data 1104, other types of information and/or electronic data, and various device applications 1112 (e.g., software applications and/or modules). For example, an operating system can be maintained as a software application with the computer-readable storage memory and executed by the processor system 1108. In this example, the device 1100 includes a graph module 1114, a policy decision module 1116, and a analysis module 1118 that implement various aspects and features of the described techniques of a repeatable NGAC policy class structure. The graph module 1114, the policy decision module 1116, and the analysis module 1118 may each be implemented with hardware components and/or in software as one of the device applications 1112, such as when the example device 1100 is implemented as any one of the decision device 802, the client device 806, the policy device 808, and the resource device 810 of the example computing environment 800 shown in FIG. 8.

An example of the graph module 1114 includes the graph module 812 that is implemented as a software application and/or as hardware components by the decision device 802. Similarly, an example of the policy decision module 1116 includes the policy decision module 814 that is implemented as a software application and/or as hardware components by the decision device 802. Further, an example of the analysis module 1118 includes the analysis module 816 that is implemented as a software application and/or as hardware components by the decision device 802. In implementations, the graph module 1114, the policy decision module 1116, and/or the analysis module 1118 may include independent processing, memory, and logic components as a computing and/or electronic device integrated with the example device 1100.

The example device 1100 can also include an audio and/or video processing system 1120 that generates audio data for an audio system 1122 and/or generates display data for a display system 1124. The audio system and/or the display system include any types of devices that generate, process, display, and/or otherwise render audio, video, display, and/or image data. In implementations, the audio system and/or the display system are integrated components of the example device 1100. Alternatively, the audio system and/or the display system are external, peripheral components to the example device.

In embodiments, at least part of the techniques described for a repeatable NGAC policy class structure may be implemented in a distributed system, such as in the context of a computing environment configured as a service mesh architecture, or as any type of an access control system. A distributed system can facilitate to abstract the functionality of hardware, such as with server devices and/or software resources of the computing environment. For example, the software resources may include applications and/or data that can be utilized while computer processing is executed on servers that are remote from the example device 1100.

Although implementations of a repeatable NGAC policy class structure have been described in language specific to features and/or methods, the appended claims are not necessarily limited to the specific features or methods described. Rather, the specific features and methods are disclosed as example implementations of the repeatable NGAC policy class structure, and other equivalent features and methods are intended to be within the scope of the appended claims. Further, various different examples are described and it is to be appreciated that each described example can be implemented independently or in connection with one or more other described examples. Additional aspects of the techniques, features, devices, and/or methods discussed herein relate to one or more of the following:

In a digital medium environment for graph-based access control, a method implemented by at least one computing device, the method comprising: generating a next generation access control (NGAC) graph having a bifurcated structure with a user section and an object section; modeling users as user elements in the user section of the NGAC graph; modeling resources as object elements in the object section of the NGAC graph; configuring multiple policy classes utilizing a composable policy class structure that is repeatable to instantiate each of the multiple policy classes in the NGAC graph, the composable policy class structure comprising: a policy class as enforceable access criteria by which the users are allowed or denied access to the resources; an exclusion default object node of the policy class instantiated in the object section of the NGAC graph; an exclusion default user node of the policy class instantiated in the user section of the NGAC graph; and an association that indicates the exclusion default object node granting all policy permissions of the policy class to the exclusion default user node.

Alternatively or in addition to the above described method, any one or combination of: the association indicates that the object elements contained as members of the exclusion default object node grant all of the policy permissions to the user elements that are members of the exclusion default user node. The policy permissions granted by the object elements allow the users to perform operations on contents of the object elements that represent the resources. One or more the user elements that represent the users in the user section of the NGAC graph are each contained as a member of the policy class via the exclusion default user node of the policy class; and one or more the object elements that represent the resources in the object section of the NGAC graph are each contained as a member of the policy class via the exclusion default object node of the policy class. The composable policy class structure is repeatable, from which the multiple policy classes are instantiated in the NGAC graph, including different types of policy classes; and the method further comprising computing a single access control decision based on the multiple, different types of policy classes in the NGAC graph. The single access control decision is based on a strict evaluation mode configured as an intersection of the policy permissions granted by the object elements to access the resources for the user elements. The multiple, different types of policy classes include at least a location policy class and a role-based access control (RBAC) policy class. The method further comprising modeling a policy node in the user section of the NGAC graph, wherein one or more of the user elements that each represent a respective user in the user section of the NGAC graph are assigned as a member of the policy node. The method further comprising modeling separable policy bindings in the user section of the NGAC graph, each separable policy binding corresponding to one of the multiple policy classes, and wherein a separable policy binding is assigned to the corresponding one of the multiple policy classes. The policy node is assigned to the separable policy bindings in the user section of the NGAC graph.

In a digital medium environment for graph-based access control, a method implemented by at least one computing device, the method comprising: executing an instantiation of a next generation access control (NGAC) graph that includes user elements representing users, object elements representing resources, and multiple policy classes modeled with a composable policy class structure that is repeatable to instantiate each of the multiple policy classes in the NGAC graph; receiving a request for a user element to access an object element of a resource in conformance with a granted access permission implemented in the NGAC graph; computing an access control decision across the multiple policy classes utilizing the NGAC graph as a basis to evaluate whether the user element is authorized to access the object element of the resource; and returning, in response to the request, the access control decision that indicates to allow or deny the user element access to the object element of the resource based on the evaluation utilizing the NGAC graph.

Alternatively or in addition to the above described method, any one or combination of: the composable policy class structure comprises: a policy class as enforceable access criteria by which the user elements are allowed or denied access to the object elements that represent the resources; an exclusion default object node of the policy class; an exclusion default user node of the policy class; and an association that indicates the object elements contained as members of the exclusion default object node grant all policy permissions of the policy class to the user elements that are members of the exclusion default user node. The policy permissions granted by the object elements allow the user elements to perform operations on contents of the object elements that represent the resources. One or more the user elements are each contained as a member of the policy class via the exclusion default user node of the policy class; and one or more the object elements are each contained as a member of the policy class via the exclusion default object node of the policy class. The access control decision is computed as a single access control decision across different types of the multiple policy classes in the NGAC graph; and the single access control decision is based on a strict evaluation mode configured as an intersection of the policy permissions granted by the object elements to access resources for the user elements. The different types of the multiple policy classes in the NGAC graph include two or more of a location policy class, a role-based access control (RBAC) policy class, or a time policy class. The NGAC graph includes separable policy bindings that each correspond to one of the multiple policy classes; and the separable policy bindings are each assigned to the corresponding one of the multiple policy classes. The NGAC graph includes a policy node assigned to the separable policy bindings; and one or more of the user elements that each represent a respective user are assigned as a member of the policy node.

A computing device implemented for graph-based access control in a digital medium environment, the computing device comprising: a memory to maintain a next generation access control (NGAC) graph that includes user elements representing users, object elements representing resources, and multiple policy classes modeled with a composable policy class structure that is repeatable to instantiate each of the multiple policy classes in the NGAC graph; a policy decision module implemented at least partially in computer hardware to: receive a request to access an object element of a resource in conformance with an access permission granted to a user element implemented in the NGAC graph;

compute an access control decision across the multiple policy classes utilizing the NGAC graph as a basis to evaluate whether the user element is authorized to access the object element of the resource; and initiate a response to the request as the access control decision that indicates to allow or deny the user element access to the object element of the resource based on the evaluation utilizing the NGAC graph.

Alternatively or in addition to the above described computing device, any one or combination of: the policy decision module is configured to model the multiple policy classes utilizing the composable policy class structure, which comprises: a policy class as enforceable access criteria by which the user elements are allowed or denied access to the object elements that represent the resources; an exclusion default object node of the policy class; an exclusion default user node of the policy class; and an association that indicates the object elements contained as members of the exclusion default object node grant all policy permissions of the policy class to the user elements that are members of the exclusion default user node.

The invention claimed is:

1. A computing device, comprising:
 a memory to maintain a next generation access control (NGAC) graph having a bifurcated structure with a user section and an object section, the user section including users modeled as user elements of the NGAC graph and the object section including resources modeled as object elements of the NGAC graph;
 a graph module implemented at least partially in computer hardware and configured to configure multiple policy classes utilizing a composable policy class structure that is repeatable to instantiate each of the multiple policy classes in the NGAC graph, the composable policy class structure including a policy class as enforceable access criteria by which the users are allowed or denied access to the resources, an exclusion default object node of the policy class instantiated in the object section of the NGAC graph, an exclusion default user node of the policy class instantiated in the user section of the NGAC graph, and an association that indicates the exclusion default object node granting all policy permissions of the policy class to the exclusion default user node, and wherein the NGAC graph includes a policy node modeled in the user section of the NGAC graph, wherein one or more of the user elements that each represent a respective user in the user section of the NGAC graph are assigned as a member of the policy node;
 a policy decision module implemented at least partially in computer hardware to evaluate the NGAC graph to determine graph information relative to one or more of a user element based at least in part on the exclusion default user node or an object element based at least in part on the exclusion default object node, the policy decision module configured to:
 receive a request for a user element to access an object element of a resource within the policy class;
 compute a single access control decision across different types of the multiple policy classes utilizing the NGAC graph; and
 output an access control decision that indicates to allow or deny the user element access to the object element of the resource based at least in part on whether the user element is a member of the policy class as designated by the exclusion default user node of the policy class.

2. The computing device of claim 1, wherein the association indicates that the object elements contained as members of the exclusion default object node grant all of the policy permissions to the user elements that are members of the exclusion default user node.

3. The computing device of claim 2, wherein the policy permissions granted by the object elements allow the users to perform operations on contents of the object elements that represent the resources.

4. The computing device of claim 1, wherein:
 one or more the user elements that represent the users in the user section of the NGAC graph are each contained as a member of the policy class via the exclusion default user node of the policy class; and
 one or more the object elements that represent the resources in the object section of the NGAC graph are each contained as a member of the policy class via the exclusion default object node of the policy class.

5. The computing device of claim 1, wherein the composable policy class structure is repeatable, from which the multiple policy classes are instantiated in the NGAC graph, including the multiple, different types of policy classes.

6. The computing device of claim 5, wherein the single access control decision is based on a strict evaluation mode configured as an intersection of the policy permissions granted by the object elements to access the resources for the user elements.

7. The computing device of claim 5, wherein the multiple, different types of policy classes include at least a location policy class and a role-based access control (RBAC) policy class.

8. The computing device of claim 1, wherein the NGAC graph includes separable policy bindings modeled in the user section of the NGAC graph, each separable policy binding corresponding to one of the multiple policy classes, and wherein a separable policy binding is assigned to the corresponding one of the multiple policy classes.

9. The computing device of claim 8, wherein the policy node is assigned to the separable policy bindings in the user section of the NGAC graph.

10. A computing device comprising:
 a memory to maintain a next generation access control (NGAC) graph that includes user elements representing users, object elements representing resources, and multiple policy classes modeled with a composable policy class structure that is repeatable to in stantiate each of the multiple policy classes in the NGAC graph, the composable policy class structure including a policy class as enforceable access criteria by which the users are allowed or denied access to the resources, an exclusion default object node of the policy class instantiated in an object section of the NGAC graph, and an exclusion default user node of the policy class instantiated in a user section of the NGAC graph, and wherein the NGAC graph includes a policy node modeled in the user section of the NGAC graph, wherein one or more of the user elements that each represent a respective user in the user section of the NGAC graph are assigned as a member of the policy node;
 a policy decision module implemented at least partially in computer hardware to evaluate the NGAC graph for an access control decision, the policy decision module configured to:
 execute an instantiation of the NGAC graph;
 receive a request for a user element to access an object element of a resource within the policy class in conformance with a granted access permission implemented in the NGAC graph;

compute the access control decision across the multiple policy classes utilizing the NGAC graph as a basis to evaluate whether the user element is authorized to access the object element of the resource; and return, in response to the request, the access control decision that indicates to allow or deny the user element access to the object element of the resource based at least in part on whether the user clement is a member of the policy class as designated by the exclusion default user node of the policy class.

11. The computing device of claim 10, wherein the composable policy class structure comprises an association that indicates the object elements contained as members of the exclusion default object node grant all policy permissions of the policy class to the user elements that are members of the exclusion default user node.

12. The computing device of claim 11, wherein the policy permissions granted by the object elements allow the user elements to perform operations on contents of the object elements that represent the resources.

13. The computing device of claim 11, wherein:
one or more of the user elements are each contained as a member of the policy class via the exclusion default user node of the policy class; and
one or more of the object elements are each contained as a member of the policy class via the exclusion default object node of the policy class.

14. The computing device of claim 10, wherein:
the access control decision is computed as a single access control decision across different types of the multiple policy classes in the NGAC graph; and
the single access control decision is based on a strict evaluation mode configured as an intersection of the policy permissions granted by the object elements to access the resources for the user elements.

15. The computing device of claim 14, wherein the different types of the multiple policy classes in the NGAC graph include two or more of a location policy class, a role-based access control (RBAC) policy class, or a time policy class.

16. The computing device of claim 10, wherein:
the NGAC graph includes separable policy bindings that each correspond to one of the multiple policy classes; and
the separable policy bindings are each assigned to the corresponding one of the multiple policy classes.

17. The computing device of claim 16, wherein:
the NGAC graph includes the policy node assigned to the separable policy bindings; and
one or more of the user elements that each represent a respective user are assigned as a member of the policy node.

18. A computing device implemented for graph-based access control in a digital medium environment, the computing device comprising:
a memory to maintain a next generation access control (NGAC) graph that includes user elements representing users, object elements representing resources, and multiple policy classes modeled with a composable policy class structure that is repeatable to instantiate each of the multiple policy classes in the NGAC graph, the composable policy class structure including a policy class as enforceable access criteria by which the users are allowed or denied access to the resources, an exclusion default object node of the policy class instantiated in an object section of the NGAC graph, and an exclusion default user node of the policy class instantiated in a user section of the NGAC graph, and wherein the NGAC graph includes a policy node modeled in the user section of the NGAC graph, wherein one or more of the user elements that each represent a respective user in the user section of the NGAC graph are assigned as a member of the policy node;
a policy decision module implemented at least partially in computer hardware to:
receive a request for a user element to access an object element of a resource in conformance with an access permission granted to the user element implemented in the NGAC graph;
compute an access control decision across the multiple policy classes utilizing the NGAC graph as a basis to evaluate whether the user element is authorized to access the object element of the resource; and
initiate a response to the request as the access control decision that indicates to allow or deny the user element access to the object element of the resource based at least in part on whether the user element is a member of the policy class as designated by the exclusion default user node of the policy class.

19. The computing device of claim 18, wherein the policy decision module is configured to model the multiple policy classes utilizing the composable policy class structure, which comprises an association that indicates the object elements contained as members of the exclusion default object node grant all policy permissions of the policy class to the user elements that are members of the exclusion default user node.

* * * * *